(12) United States Patent
Vroom et al.

(10) Patent No.: US 10,365,688 B1
(45) Date of Patent: Jul. 30, 2019

(54) ALIGNMENT SLEEVE FOR DOCKING STATION

(71) Applicant: Henge Docks LLC, Arlington, VA (US)

(72) Inventors: Matthew Leigh Vroom, San Francisco, CA (US); Brandon Parod, Alameda, CA (US)

(73) Assignee: Henge Docks LLC, Arlington, VA (US)

( * ) Notice: Subject to any disclaimer, the term of this patent is extended or adjusted under 35 U.S.C. 154(b) by 0 days.

(21) Appl. No.: 15/957,664

(22) Filed: Apr. 19, 2018

(51) Int. Cl.
*G06F 1/16* (2006.01)
*H01R 12/71* (2011.01)
*H01R 13/631* (2006.01)

(52) U.S. Cl.
CPC .......... *G06F 1/1632* (2013.01); *H01R 12/716* (2013.01); *H01R 13/631* (2013.01); *G06F 1/1626* (2013.01)

(58) Field of Classification Search
CPC .............................. G06F 1/1632; G06F 1/1626
USPC .......................................................... 439/78
See application file for complete search history.

(56) References Cited

U.S. PATENT DOCUMENTS

| 253,129 | A | 11/1950 | Olson |
|---|---|---|---|
| 290,366 | A | 9/1959 | Cornell, Jr. |
| 3,727,171 | A | 4/1973 | Coles et al. |
| 3,775,733 | A | 11/1973 | Ege |
| 3,781,766 | A | 12/1973 | Teagno et al. |
| 3,816,821 | A | 6/1974 | Rhodes |
| 3,873,172 | A | 3/1975 | Paullus |
| 4,097,113 | A | 6/1978 | McKelvy |
| 4,178,060 | A | 12/1979 | Coffey |
| 4,387,951 | A | 6/1983 | Hall et al. |
| 4,418,975 | A | 12/1983 | O'Keefe, II |
| 4,490,002 | A | 12/1984 | Fowler |
| 4,659,166 | A | 4/1987 | Morningstar et al. |
| 4,726,789 | A | 2/1988 | Yaffe |
| 4,762,388 | A | 8/1988 | Tanaka et al. |
| 4,836,804 | A | 6/1989 | London et al. |
| 4,842,363 | A | 6/1989 | Margolin et al. |
| 4,870,702 | A | 9/1989 | Azzouni |
| 4,881,910 | A | 11/1989 | Odemer |
| 4,899,591 | A | 2/1990 | Kibblewhite |
| 5,030,128 | A | 7/1991 | Herron et al. |
| 5,092,788 | A | 3/1992 | Pristupa, Jr. et al. |
| 5,137,455 | A | 8/1992 | Moerbe et al. |
| 5,186,646 | A * | 2/1993 | Pederson ............... G06F 1/1632 361/679.4 |
| 5,225,825 | A | 7/1993 | Warren |
| 5,411,416 | A | 5/1995 | Balon et al. |
| 5,460,547 | A | 10/1995 | Belt et al. |
| 5,569,052 | A | 10/1996 | Belt et al. |
| 5,679,026 | A | 10/1997 | Fain et al. |

(Continued)

*Primary Examiner* — Tulsidas C Patel
*Assistant Examiner* — Peter G Leigh
(74) *Attorney, Agent, or Firm* — Benjamin E. Maskell

(57) ABSTRACT

Disclosed is a docking station for an electronic device having a main body, a slot with an opening on a top of the main body, a first connector in the slot, and a sleeve slidably disposed in the slot. The sleeve is sized in relative proportions to receive the electronic device and is configured to slide within the slot between a first position and a second position. In the first position, the first connector is outside of the sleeve and in the second position, the first connector protrudes into the sleeve.

20 Claims, 19 Drawing Sheets

(56) References Cited

U.S. PATENT DOCUMENTS

| | | |
|---|---|---|
| 5,683,261 A | 11/1997 | Ahles et al. |
| 5,725,397 A | 3/1998 | Fukamachi et al. |
| 5,729,478 A | 3/1998 | Ma et al. |
| 5,738,537 A | 4/1998 | Setoguchi et al. |
| 5,805,412 A | 9/1998 | Yanagisawa et al. |
| 5,825,617 A | 10/1998 | Kochis |
| 6,045,410 A | 4/2000 | Norizuki et al. |
| 6,046,571 A | 4/2000 | Bovio et al. |
| 6,061,233 A | 5/2000 | Jung |
| 6,119,237 A | 9/2000 | Cho |
| 6,151,218 A | 11/2000 | Pirdy et al. |
| 6,175,926 B1 | 1/2001 | Fogle |
| 6,193,546 B1* | 2/2001 | Sadler ............ A45F 5/02 439/165 |
| 6,206,578 B1 | 3/2001 | Shin et al. |
| 6,309,230 B2 | 10/2001 | Helot |
| 6,312,295 B2 | 11/2001 | Nishimatsu |
| 6,321,340 B1 | 11/2001 | Shin et al. |
| 6,343,957 B1 | 2/2002 | Kuo et al. |
| 6,352,447 B1 | 3/2002 | Ruth |
| 6,411,503 B1 | 6/2002 | Kambayashi et al. |
| 6,424,524 B2 | 7/2002 | Bovio et al. |
| 6,524,140 B2 | 2/2003 | Takagi et al. |
| 6,558,201 B1 | 5/2003 | Begley et al. |
| 6,663,439 B2 | 12/2003 | Henry et al. |
| 6,666,715 B2 | 12/2003 | Fujita et al. |
| 6,697,892 B1 | 2/2004 | Laity et al. |
| 6,724,615 B2 | 4/2004 | Kambayashi et al. |
| 6,767,253 B1 | 7/2004 | Werner et al. |
| 6,796,844 B1 | 9/2004 | Edwards, III |
| 6,814,626 B2 | 11/2004 | Wen-Yao |
| 6,878,016 B2 | 4/2005 | Wulff et al. |
| 6,934,788 B2 | 8/2005 | Laity et al. |
| 6,943,527 B2 | 9/2005 | Liu et al. |
| 7,077,709 B1 | 7/2006 | Shin-Ting |
| 7,081,025 B2 | 7/2006 | Zhang et al. |
| 7,094,112 B2 | 8/2006 | Arai et al. |
| 7,144,278 B2 | 12/2006 | Le Gallic et al. |
| 7,184,266 B1 | 2/2007 | Chen |
| 7,247,032 B2 | 7/2007 | Merz |
| 7,320,614 B2 | 1/2008 | Toda et al. |
| 7,417,855 B2 | 8/2008 | Carnevali |
| 7,480,138 B2* | 1/2009 | Kogan ............ B60R 11/0241 361/679.02 |
| 7,503,808 B1 | 3/2009 | O'Shea |
| 7,508,661 B2 | 3/2009 | Carnevali |
| 7,554,819 B2 | 6/2009 | Chen et al. |
| 7,563,140 B1 | 7/2009 | Wan et al. |
| 7,601,024 B2 | 10/2009 | Martich |
| 7,675,746 B2* | 3/2010 | Crooijmans ........ G06F 1/1632 361/679.41 |
| 7,690,944 B2 | 4/2010 | Matsumura et al. |
| 7,778,023 B1* | 8/2010 | Mohoney ............ G06F 1/1632 312/223.2 |
| 7,857,664 B2 | 12/2010 | Waryck et al. |
| 7,914,348 B1 | 3/2011 | Lin |
| 7,942,705 B2 | 5/2011 | Murphy et al. |
| 8,079,880 B2 | 12/2011 | Lin et al. |
| 8,105,108 B2 | 1/2012 | Vroom et al. |
| 8,212,145 B2 | 7/2012 | Nagai et al. |
| 8,272,903 B2 | 9/2012 | Lin |
| 8,353,730 B1 | 1/2013 | Wang et al. |
| 8,419,479 B2 | 4/2013 | Vroom et al. |
| 8,512,079 B2 | 8/2013 | Vroom et al. |
| 8,512,080 B2 | 8/2013 | Vroom et al. |
| 8,568,160 B2 | 10/2013 | Coggins et al. |
| 8,585,443 B1 | 11/2013 | Vroom et al. |
| 8,634,188 B2* | 1/2014 | Haren ............ G06F 1/1632 361/679.41 |
| 8,699,211 B2 | 4/2014 | Kao |
| 8,821,193 B2* | 9/2014 | Vroom ............ H01R 13/512 439/540.1 |
| 8,951,067 B2* | 2/2015 | Vroom ............ H01R 13/405 439/606 |
| 9,710,016 B1* | 7/2017 | Porzio ............ G06F 1/1632 |
| 2001/0012718 A1 | 8/2001 | Nishimatsu |
| 2001/0012734 A1 | 8/2001 | Nishimatsu |
| 2002/0037669 A1 | 3/2002 | D'Addario |
| 2002/0115480 A1* | 8/2002 | Huang ............ H02J 7/0027 455/573 |
| 2002/0123271 A1 | 9/2002 | Henry et al. |
| 2003/0095395 A1 | 5/2003 | Clark et al. |
| 2003/0220001 A1 | 11/2003 | Milan |
| 2004/0053538 A1 | 3/2004 | Villain |
| 2004/0077225 A1 | 4/2004 | Chun-Fu |
| 2004/0115994 A1 | 6/2004 | Wulff et al. |
| 2004/0120112 A1 | 6/2004 | Mullen et al. |
| 2005/0026510 A1 | 2/2005 | Orihara |
| 2005/0064765 A1 | 3/2005 | Simpson et al. |
| 2005/0070170 A1 | 3/2005 | Zhang et al. |
| 2005/0112940 A1 | 5/2005 | Naganishi |
| 2005/0168937 A1 | 8/2005 | Yin et al. |
| 2005/0266720 A1 | 12/2005 | Lin |
| 2005/0286219 A1 | 12/2005 | Kim |
| 2006/0061964 A1 | 3/2006 | Cheng |
| 2006/0079136 A1 | 4/2006 | Wei |
| 2006/0085584 A1 | 4/2006 | Chen et al. |
| 2006/0139875 A1 | 6/2006 | Cheng et al. |
| 2006/0148328 A1 | 7/2006 | Le Gallic |
| 2006/0171112 A1 | 8/2006 | Lev et al. |
| 2006/0250767 A1 | 11/2006 | Brophy et al. |
| 2007/0014080 A1 | 1/2007 | McCormack |
| 2007/0047198 A1* | 3/2007 | Crooijmans ........ G06F 1/1632 361/679.41 |
| 2007/0070598 A1 | 3/2007 | Chuang |
| 2007/0224889 A1 | 9/2007 | Ito |
| 2007/0232152 A1 | 10/2007 | Hong |
| 2009/0009957 A1* | 1/2009 | Crooijmans ........ G06F 1/1632 361/679.41 |
| 2009/0016015 A1 | 1/2009 | Seibert et al. |
| 2009/0023347 A1 | 1/2009 | Hou et al. |
| 2009/0158423 A1 | 6/2009 | Orlassino et al. |
| 2010/0073862 A1 | 3/2010 | Carnevali |
| 2010/0158297 A1* | 6/2010 | Stuczynski ........ G06F 1/1632 381/332 |
| 2010/0195279 A1 | 8/2010 | Michael |
| 2010/0197173 A1 | 8/2010 | Tsunoda et al. |
| 2010/0243398 A1 | 9/2010 | Nagami |
| 2010/0265652 A1 | 10/2010 | Agata et al. |
| 2011/0065314 A1* | 3/2011 | Vroom ............ H01R 13/512 439/540.1 |
| 2011/0103003 A1 | 5/2011 | Ward et al. |
| 2011/0134601 A1 | 6/2011 | Sa |
| 2011/0242754 A1 | 10/2011 | Morton |
| 2011/0273838 A1 | 11/2011 | Lin |
| 2011/0279966 A1 | 11/2011 | Sayavong |
| 2011/0292584 A1* | 12/2011 | Hung ............ G06F 1/1626 361/679.26 |
| 2011/0318944 A1 | 12/2011 | Lin et al. |
| 2012/0127651 A1 | 5/2012 | Kwon et al. |
| 2012/0162902 A1 | 6/2012 | Zhou et al. |
| 2012/0212900 A1 | 8/2012 | Hung |
| 2013/0137297 A1* | 5/2013 | Vroom ............ H01R 13/512 439/540.1 |
| 2013/0148289 A1 | 6/2013 | Kwon |
| 2013/0170131 A1* | 7/2013 | Yen ............ G06F 1/1632 361/679.44 |
| 2014/0038450 A1 | 2/2014 | Vroom et al. |
| 2014/0094058 A1* | 4/2014 | Vroom ............ H01R 13/405 439/540.1 |
| 2014/0328020 A1 | 11/2014 | Galant |

\* cited by examiner

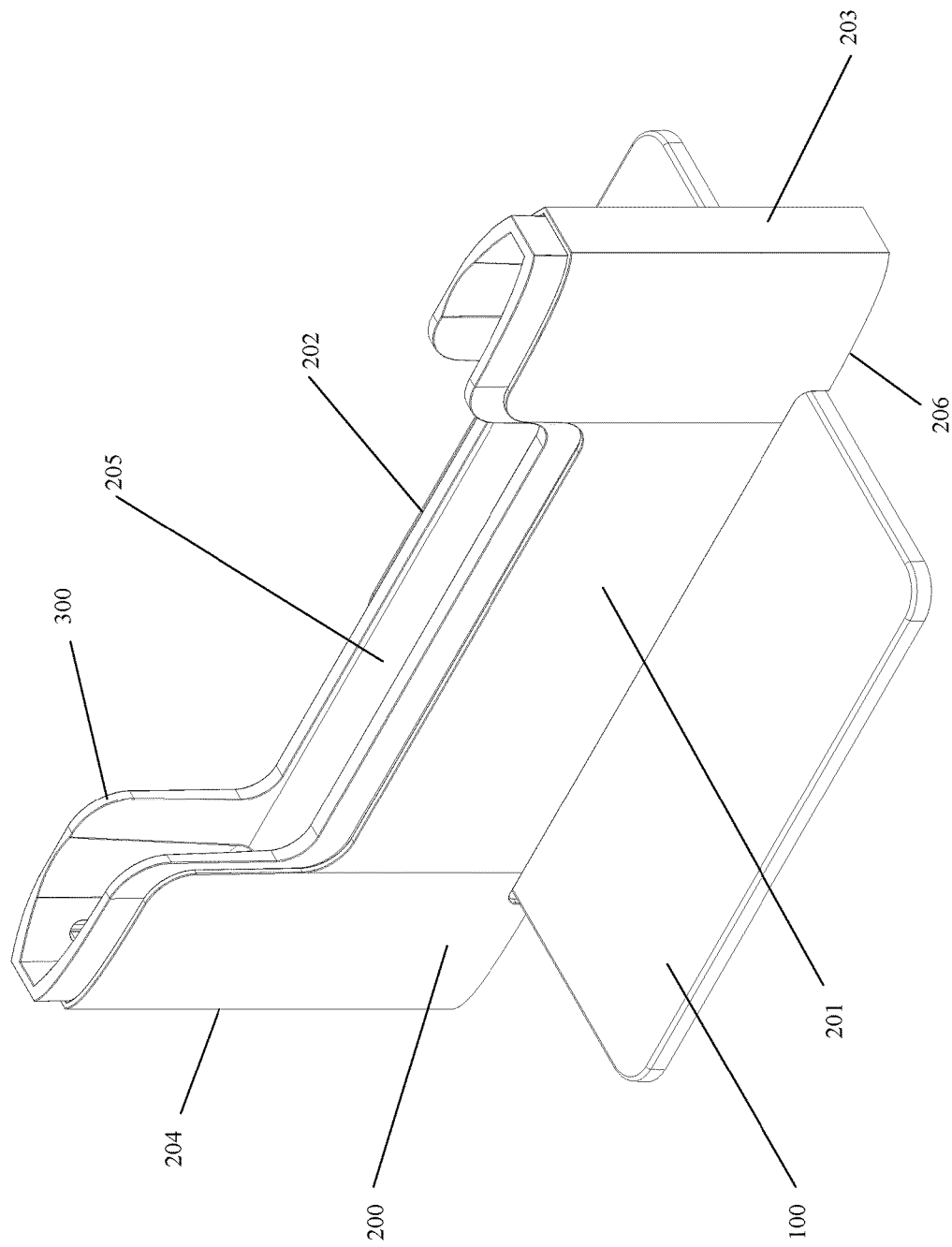

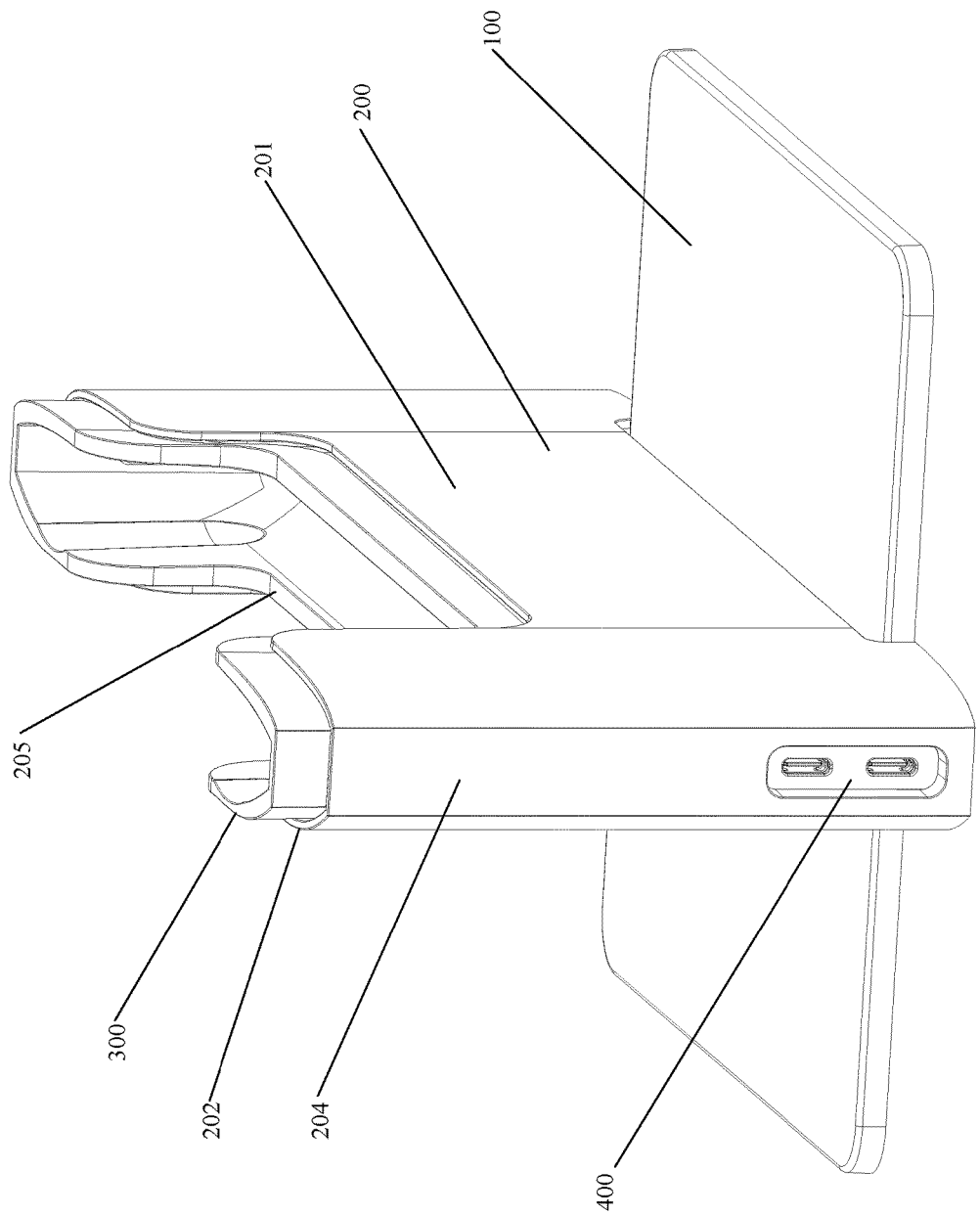

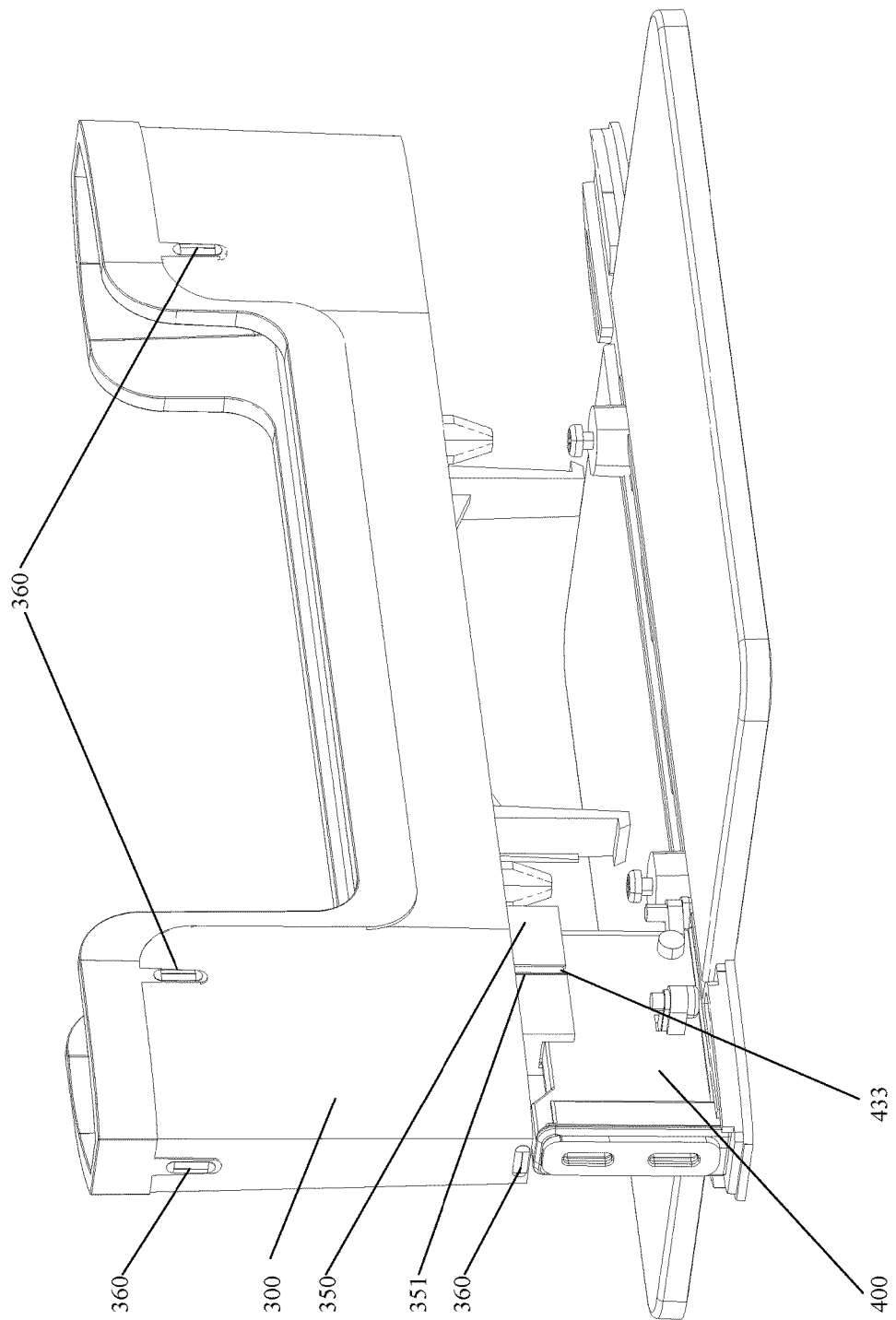

ALIGNMENT SLEEVE FOR DOCKING STATION

BACKGROUND OF THE INVENTION

Field of the Invention

The embodiments of the invention relate docking stations for electronic devices such as tablets and computers, and more particularly, to a to an alignment sleeve for a docking station. Although embodiments of the invention are suitable for a wide scope of applications, it is particularly suitable for quickly docking and undocking a laptop computer from a docking station.

Discussion of the Related Art

The related art includes, generally, U.S. Pat. No. 8,821, 193 of Vroom ('193 Patent). According to the '193 Patent, a docking station can hold a laptop in a vertical position. See e.g. '193 Pat., FIG. 5. An upright portion of the docking station disclosed in the '193 Patent holds and stabilizes the laptop. The docking station of the '193 Patent includes connectors in the upright portion that are disposed in relative position to interface with corresponding ports of a laptop computer. See e.g. '193 Pat., FIG. 10. The subject matter of the '193 Patent was commercialized by applicant in, among other things, its docking stations for the MacBook Air.

Problems existed, however, in the docking station disclosed in the '193 Patent. For example, the inside portion of the docking station was covered in a rubberized material (see, '193 Patent, FIG. 10, element 125). While this material was beneficial for protecting a laptop inserted therein, the rubberized material could cause binding if the laptop was not inserted and removed exactly on-axis. Off-axis insertion or removal could easily jam the laptop in the docking station. The connectors in the docking station of the '193 Patent also required significant force to remove. When combined with the weight of the laptop, the total extraction force required to remove a docked laptop from the docking station of the '193 Patent became unwieldy and difficult for many users to execute without twisting (and thereby binding) the laptop in the docking station. Further, because the extraction force of the related art docking stations was high, users had to hold the base of the docking station with one hand, while precisely pulling on the laptop with the other hand to undock a laptop. While the total extraction force is estimated to be 8-10 pounds, precisely maneuvering such weight to perform undocking is difficult and frustrated many users. Thus, improvements are needed in the related art to facilitate easy docking and undocking of a laptop from a docking station.

SUMMARY OF THE INVENTION

Accordingly, embodiments of the invention are directed to an alignment sleeve for a docking station that substantially obviates one or more of the problems due to limitations and disadvantages of the related art.

An object of embodiments of the invention is to provide a mechanism to assist a user in aligning a computer with the ports of a docking station;

Another object of embodiments of the invention is to provide mechanical assistive force to aid a user in removing a laptop from a docking station.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, docking station includes a main body, a slot with an opening on a top of the main body, a first connector in the slot, and a sleeve slidably disposed in the slot. The sleeve is sized in relative proportions to receive the electronic device and is configured to slide within the slot between a first position and a second position. In the first position, the first connector is outside of the sleeve and in the second position, the first connector protrudes into the sleeve.

In another aspect, a docking station includes a main body, a slot with an opening on a top of the main body, a first connector in the slot, a second connector in the slot, and a sleeve slidably disposed in the slot. The sleeve is sized in relative proportions to receive the electronic device and configured to slide within the slot between a first position and a second position. The docking station also has a hole in the sleeve and the hole is positioned to allow at least the first connector to pass therethrough. The sleeve has a guide collar surrounding the hole in the sleeve and the guide collar is sized in relative proportions to a stem of the first connector such that, in cooperation, the stem is slidably disposed in the guide collar to position the first connector with respect to a first port of the electronic device.

In yet another aspect, an alignment sleeve for a docking station includes a main body, a slot having an opening on a top of the main body, and a connector module in the slot. The connector module has a first connector positioned to interface with a first port of the electronic device. The connector module has a second connector positioned to interface with a second port of the electronic device. The connector module has a circuit board connected to the first connector and the second connector, a cover at least partially covering the first and second connectors and the circuit board, and a projection on an inside of the cover. The projection is positioned to contact and support the circuit board. The main body has a hole in the slot that is sized in relative proportions to receive at least the first and second connectors of the connector module.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIG. 1 is an isometric view of a docking station for an electronic device;

FIG. 2A is a rear perspective view of a docking station for an electronic device;

FIGS. 5A-5D are perspective views of a docking station for an electronic device with a main body-portion removed to show details;

DETAILED DESCRIPTION OF THE PREFERRED EMBODIMENTS

Figure 2B:
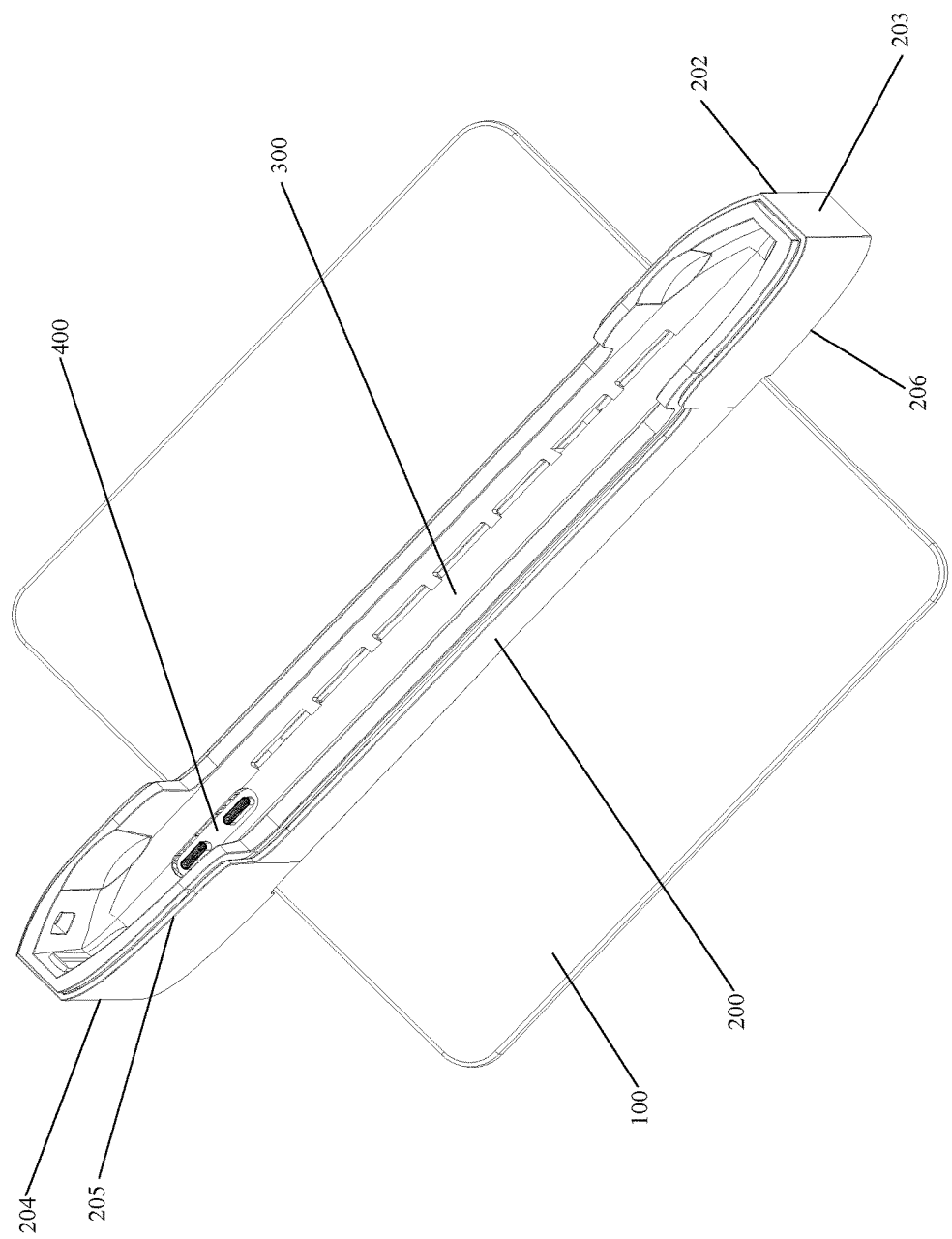
FIG. 2B is a top perspective view of a docking station for an electronic device.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

FIG. 1 is an isometric view of a docking station for an electronic device. As shown in FIG. 1, a docking station for an electronic device can include a base 100, a body 200, and a sleeve 300. The docking station can have a left side 201, right side 202, front side 203, rear side, 204 top side 205, and bottom side 206. The aforementioned sides 201-206 refer generally to the sides of the docking station and are also used as reference points for the other components to be described herein. For example, although not specifically labeled, the sleeve 300 has a left side near 201 and the base 100 has a front side near 203.

The body 200 can extend vertically from and be attached to the base 100. The base 100 can extend horizontally to provide a foundation for the body 200. The sleeve 300 can be slidably disposed in the body 200. The sleeve 300 can be formed in relative proportions to receive an electronic device (see, e.g. FIG. 10).

FIG. 2A is a rear perspective view of a docking station for an electronic device and FIG. 2B is a top perspective view of a docking station for an electronic device. As shown in FIGS. 2A and 2B, a docking station for an electronic device can include a base 100, a body 200, a sleeve 300, a connector block 400. The docking station can have a left side 201, right side 202, front side 203, rear side, 204 top side 205, and bottom side 206.

Figure 3:
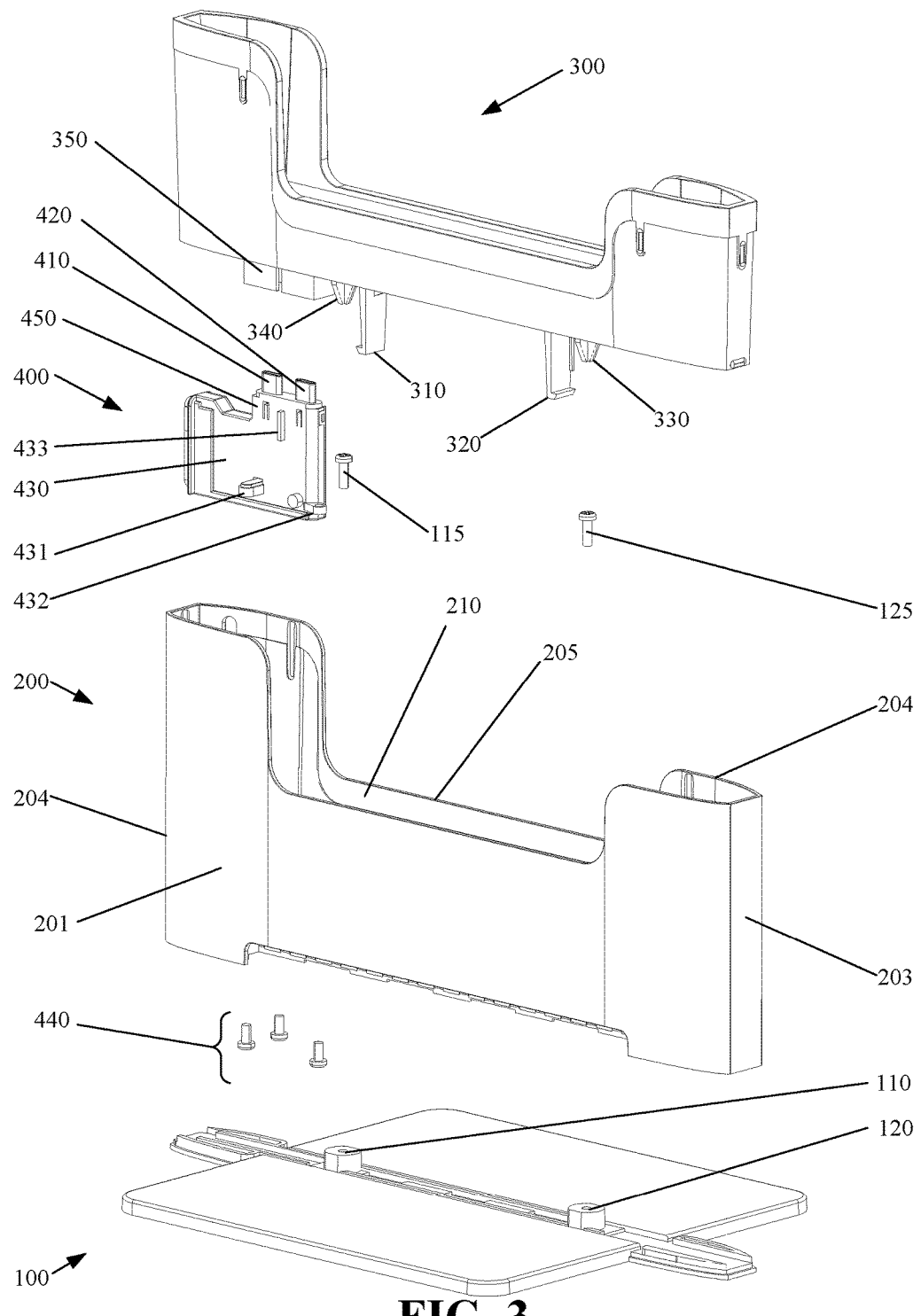
FIG. 3 is an assembly view of a docking station for an electronic device.

FIG. 3 is an assembly view of a docking station for an electronic device. As shown in FIG. 3, a docking station for an electronic device can include a base 100, a body 200, a sleeve 300, a connector block 400. The docking station can have a left side 201, right side 202, front side 203, rear side, 204 top side 205, and bottom side 206.

The base 100 can have screw holes 110 and 120 for receiving screws 115 and 125, respectively. The screws 115 and 125 can cooperate to attach the body 200 to the base 100.

The body can have a slot 210 formed in the top 205. The slot 210 can be formed in relative proportions to slidably receive the sleeve 300.

The connector block 400 can be attached to the body 200 with screws 440. The screws 440 can attach the connector block 400 to the body 200. The screws 440 can be received in mounting points 431, 432, and 436 (in FIG. 4B) of the connector block 400. The connector block 400 can include connectors 410 and 420, a left-side shell 430, and a stem 450. The left shell 430 can include a keyed guide rail 433.

The sleeve 300 can include latches 310 and 320, spring guides 330 and 340, and guide collar 350. Guide collar 350 can be sized in relative proportions to slidably receive the stem 450 of the connector block 400. The guide collar 350 can be notched (not labeled) to slidably receive the keyed guide rail 433. The latches 310 and 320 can semi-permanently attach the sleeve 300 to the body 200. The spring guides 330 and 340 can receive and compress coil springs (not shown) such that when the sleeve 300 is connected to the body 200 with latches 340 and 330, the sleeve 300 is spring-biased away from the body yet retained in the body by the latches 340 and 330. An electronic device such as a laptop computer can be pressed into the sleeve 300 and, with sufficient force, compress the springs to slide the sleeve 300 further into the body 200 and sliding the connectors 410 and 420 into the sleeve 300 where the connectors 410 and 420 can slidably interface with corresponding ports of an electronic device. In preferred embodiments of the invention, the centers of the connectors 410 and 420 are separated by 14.875 mm.

The ports of the electronic device (not shown) can have, generally, an insertion force and a removal force. The insertion force and the removal force can be approximately equal. The removal force can be higher than the insertion force because of an internal latching mechanism between the ports of the electronic device and the connectors 410 and 420. For example, it may take 10 newtons of force to insert or remove a USB-C connector into a corresponding port of a laptop computer. In the exemplary embodiments of the invention described herein, a docking station can have two connectors 410 and 420 and a laptop computer can weigh, for example, 10 newtons. Thus, the collective force (ignoring other source of friction) required to lift and remove a laptop inserted into the top of the docking station can total approximately 30 newtons (~6.7 lbs.). The upward spring bias exerted on the sleeve 300 by the springs (not shown) can preferably be equal to the net removal force of the connectors 410 and 420. In the present example, the springs (not shown) can collectively exert 20 newtons upwardly on the sleeve 300. When inserting a laptop into the docking station, the weight of the laptop combined with a downward force by a user can compress the springs and cause the connectors 410 and 420 to enter into the corresponding ports of the laptop computer. On removal, the springs can assist the user in creating the remove force necessary to remove the connectors 410 and 420 from the laptop.

This spring-assisted-removal is advantageous for four reasons: (1) because the weight of the laptop can create a great portion of the force needed to compress the springs and overcome the insertion force necessary to push the connectors 410 and 420 into the laptop; (2) because insertion is performed by pressing the laptop down into the sleeve 300, a user can easily leverage his body weight to muster the force needed to compress the springs; (3) because the spring force is approximately equal to the removal force of the connectors 410 and 420, removing the laptop from the docking station requires little more effort than simply lifting the weight of the laptop alone; and (4) because a user removing a laptop by lifting cannot leverage his body weight to lift the laptop, and thus assistance in removal is preferred over assistance in insertion.

Figure 4A:
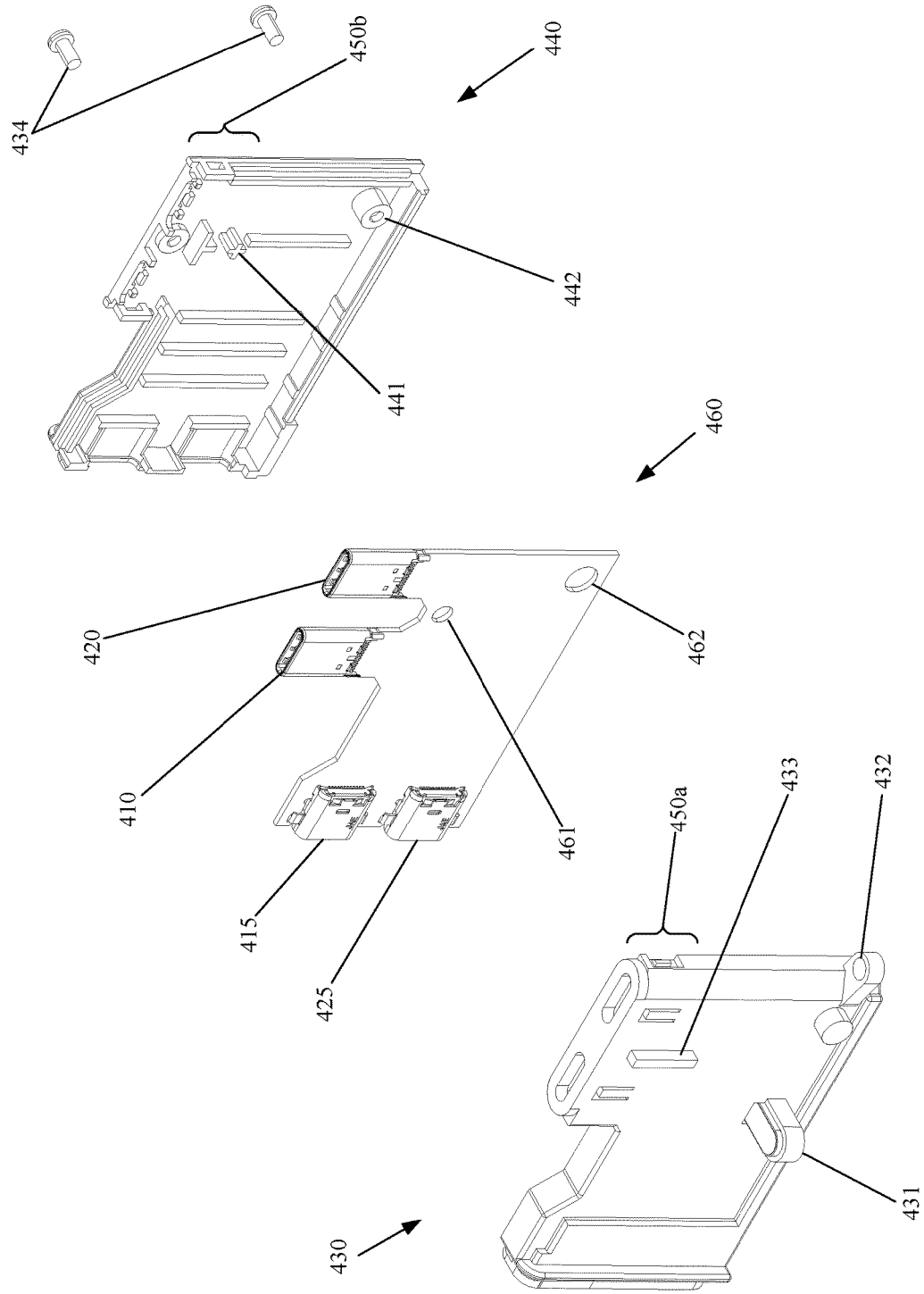
FIG. 4A-4B are assembly views of a connector block of a docking station for an electronic device.
Figure 4B:
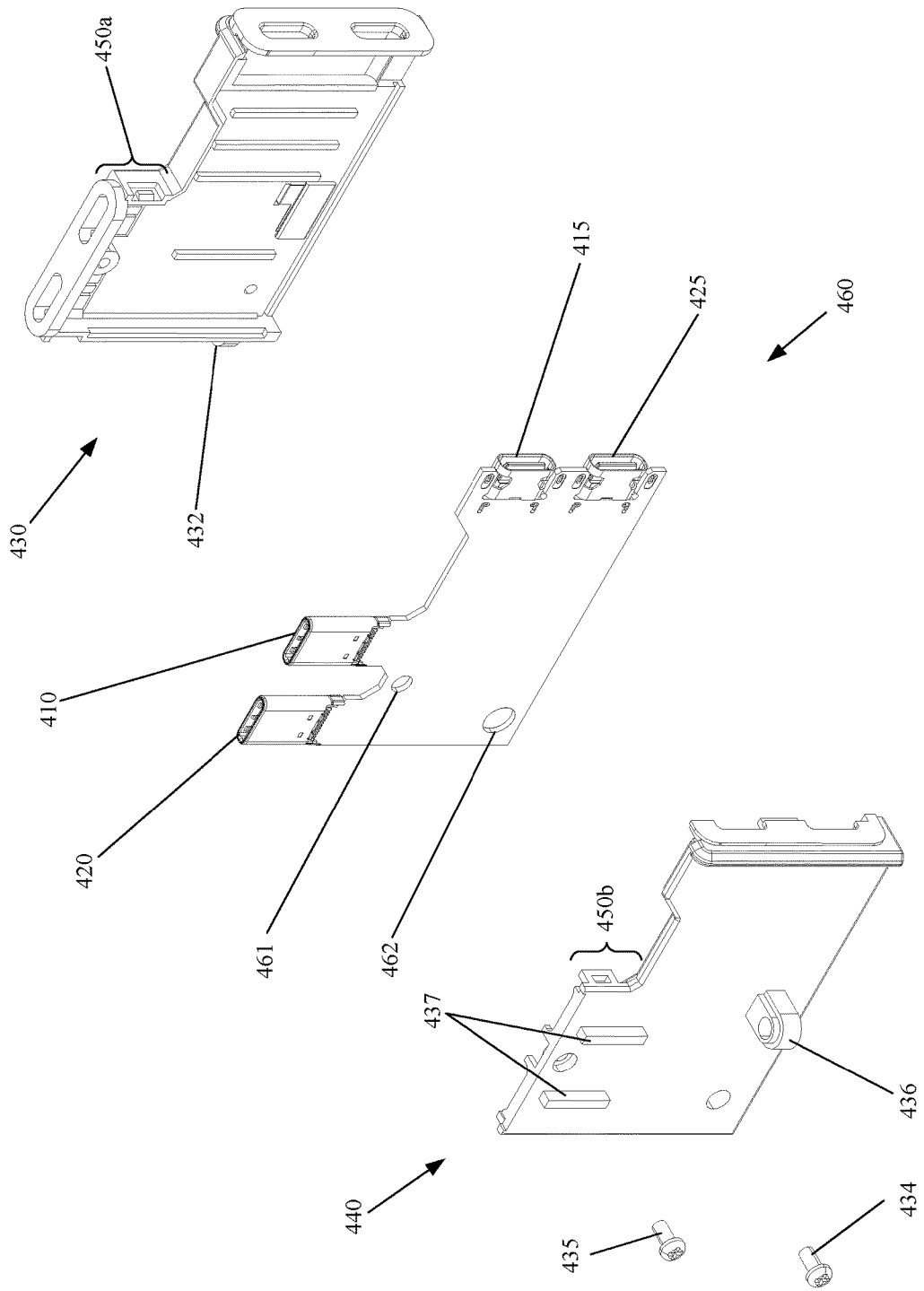
Figure 5A:
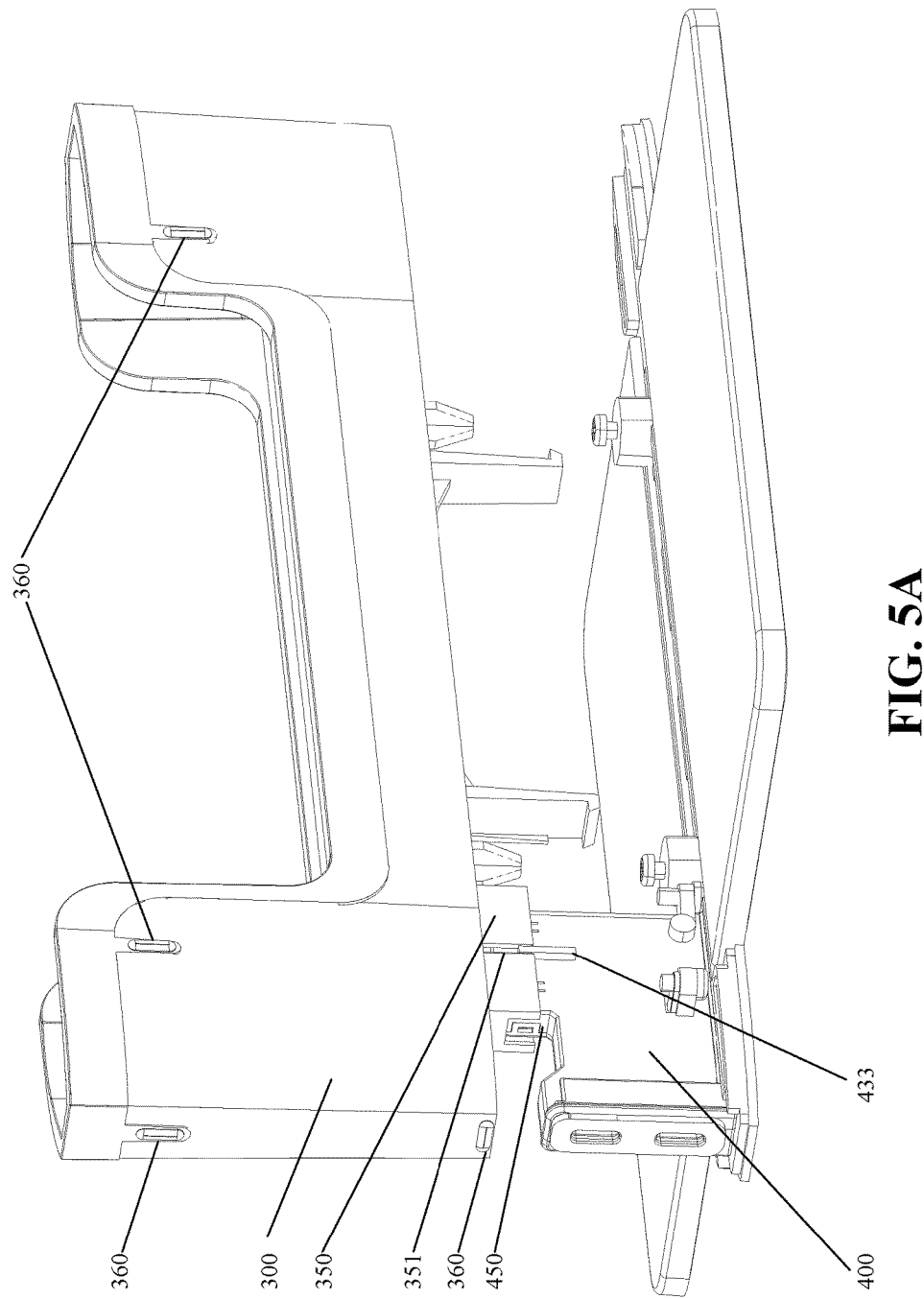
Figure 5B:
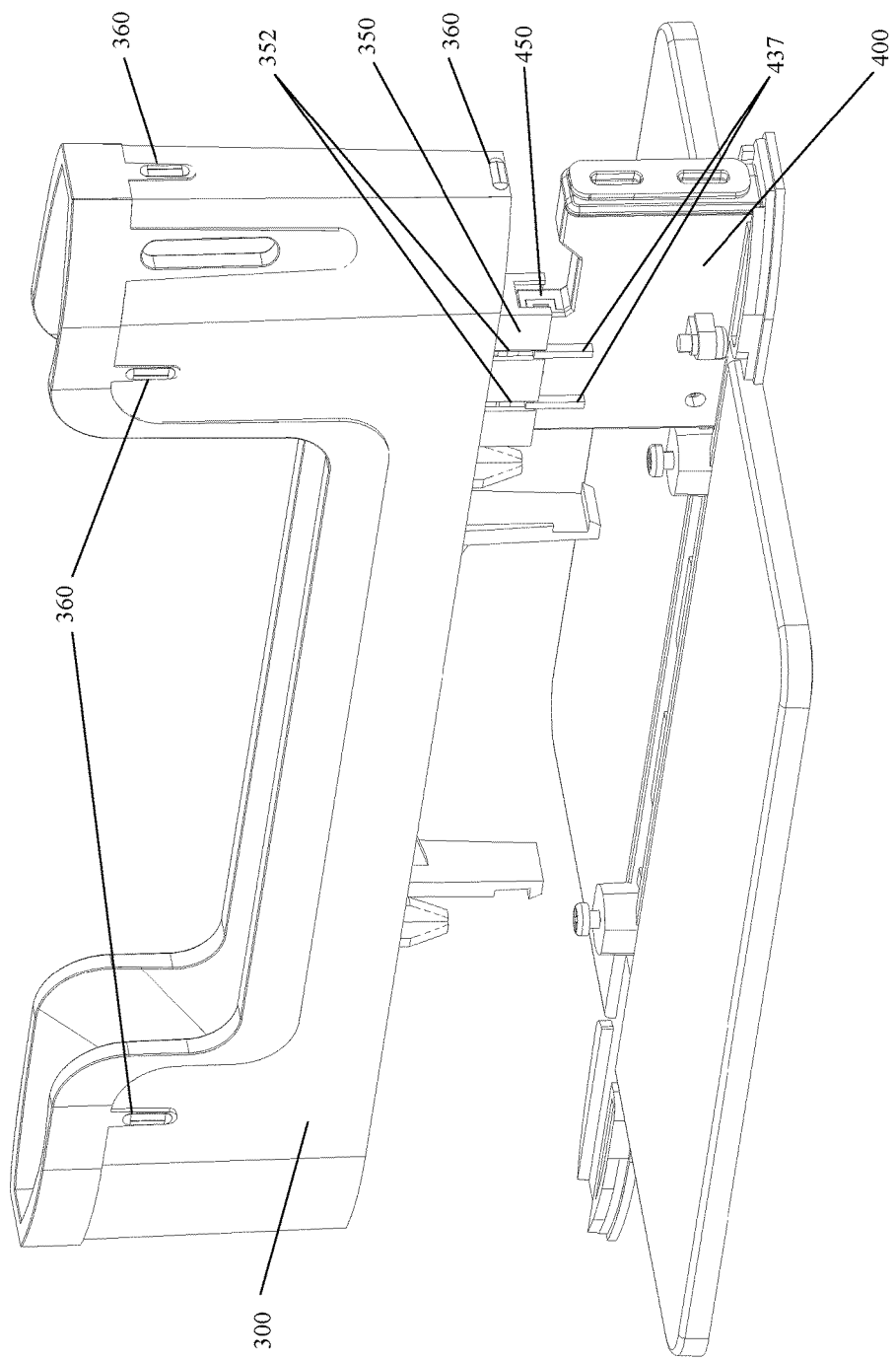
Figure 5D:
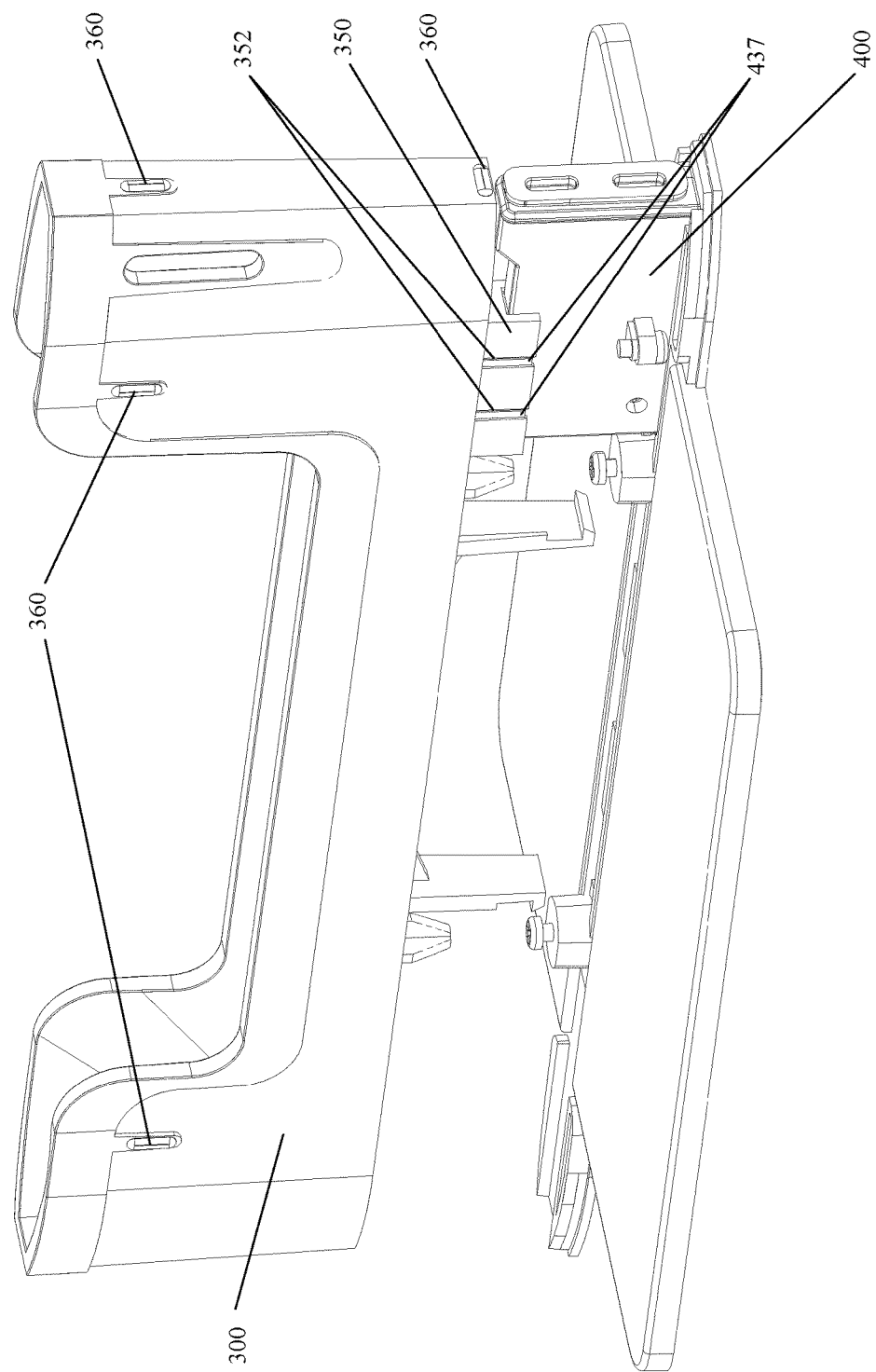
Figure 6A:
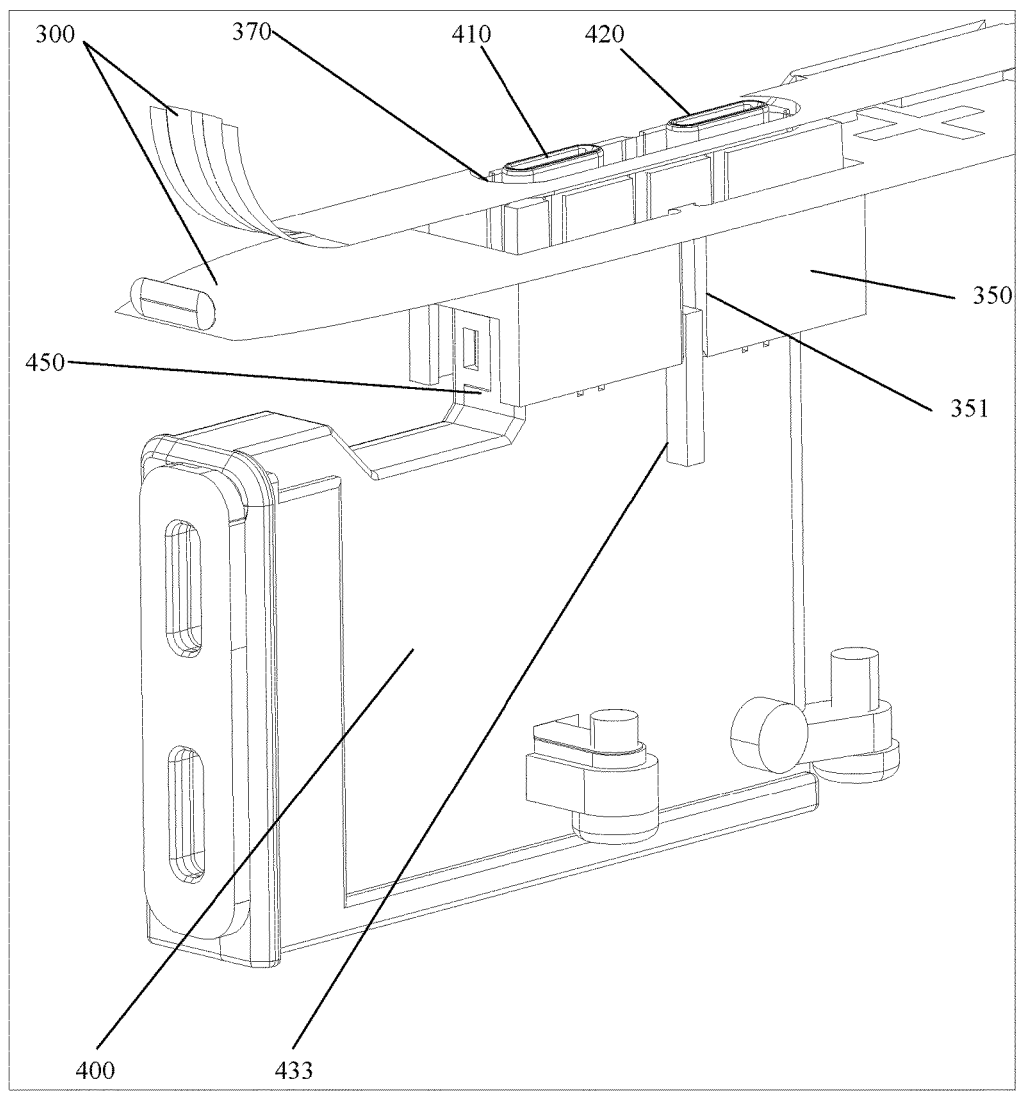
FIGS. 6A-6D are perspective views of a connector block and sleeve of a docking station for an electronic device with a main body removed to show details.
Figure 6B:
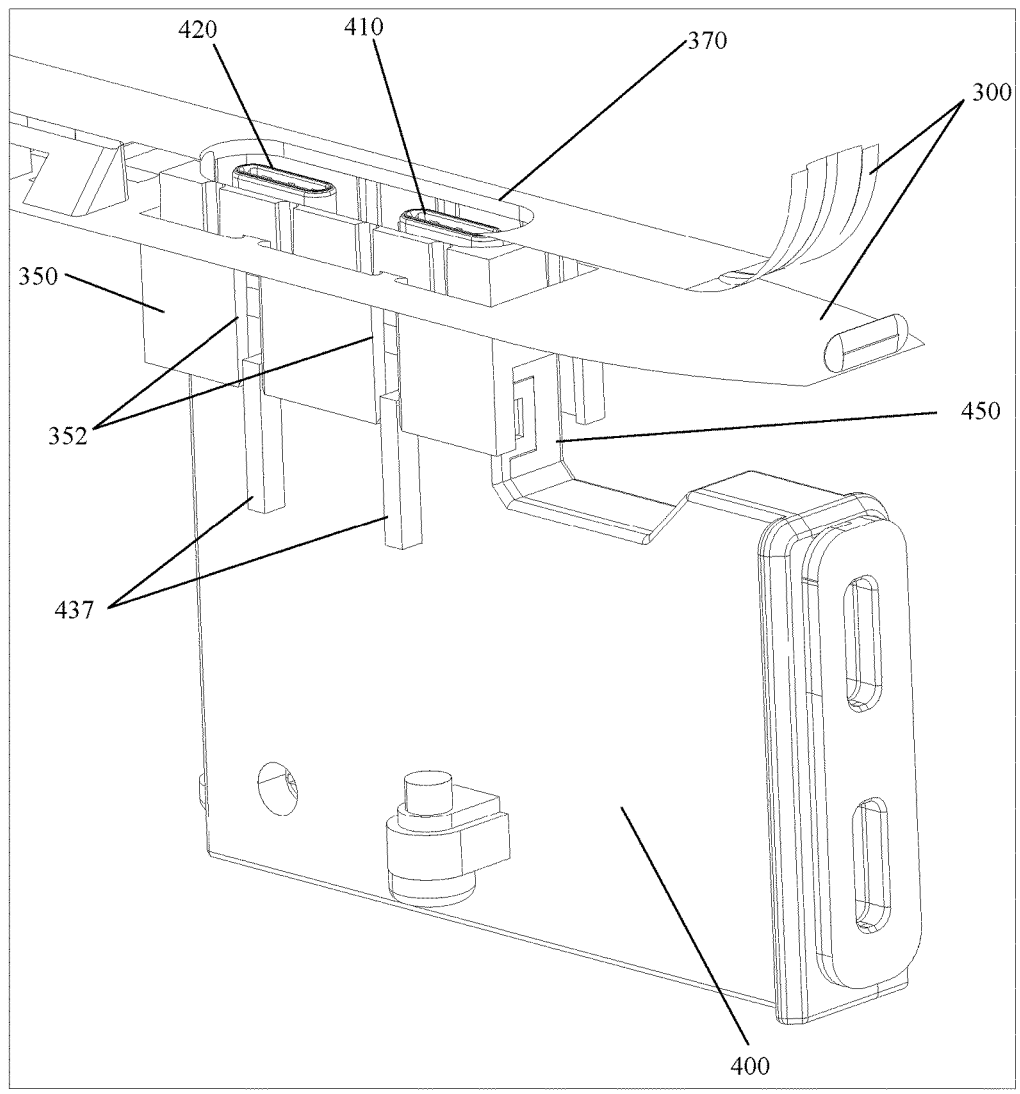
Figure 6C:
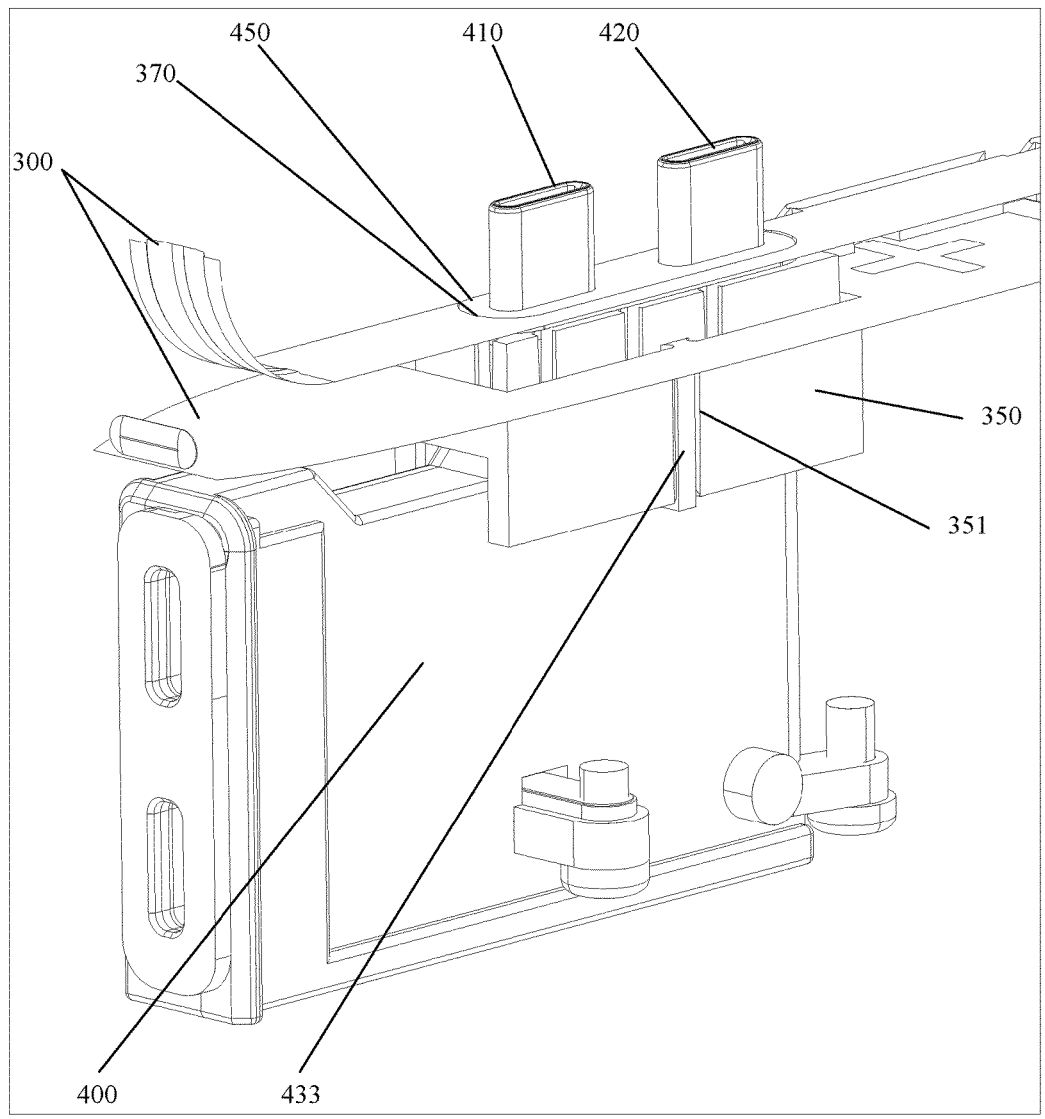
Figure 6D:
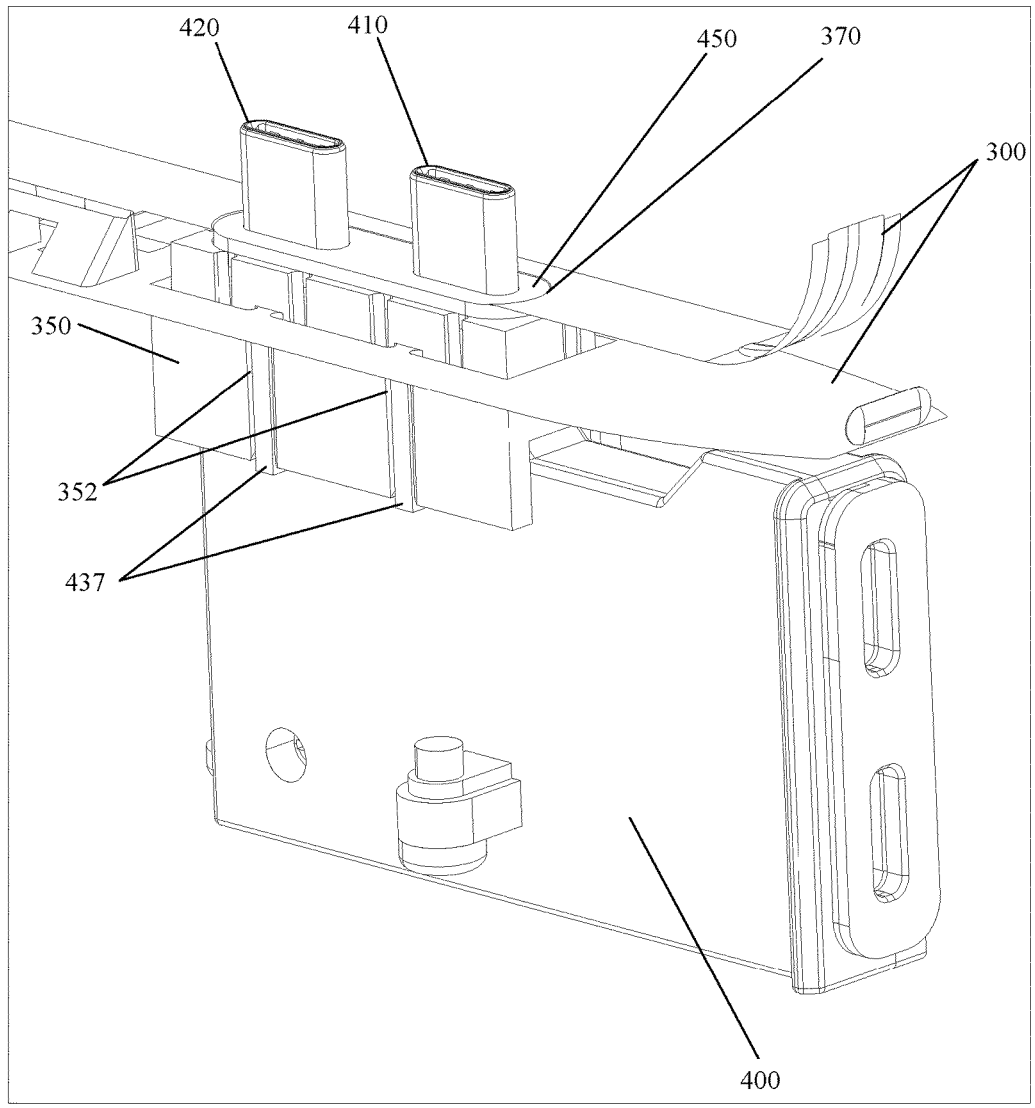

FIG. 4A-4B are assembly views of a connector block of a docking station for an electronic device. FIG. 4A shows, generally, left-side views of the components of a connector block and FIG. 4B shows, generally, right-side views of the components of a connector block. As shown in FIGS. 4A and 4B, a connector block can include a left side shell 430, a right-side shell 440 and a circuit board 460.

The left side shell 430 can include mounting points 431 and 432 for receiving screws 440 (FIG. 3). The left side shell 430 can include keyed guide rail 433 and stem 450a. The right-side shell 440 can include mounting point 436, keyed guide rails 437, and stem 450b. Screws 434 and 435 can connect the right-side shell 440 to the left side shell 430. The right-side shell 440 can further include mounting points 441 and 442. The circuit board 460 can include connectors 410 and 420 and ports 415 and 425. The circuit board 460 can include holes 461 and 462 that correspond in size and location to mounting points 441 and 442 on the right-side shell 440.

In cooperation, the holes 461 and 462 can receive mounting points 441 and 442 to secure the circuit board 460 in the right-side shell 440. The mounting points 441 and 442 can support the circuit board 460 and hold the connectors 410 and 420 in position to interface with corresponding ports of an electronic device. The mounting points 441 and 442 can receive and diffuse force exerted on the circuit board by the connectors 410 and 420 when the connectors are being pressed into the ports of a laptop computer.

Connectors 410 and 420 can correspond and be electrically connected to ports 415 and 425, respectively. The interconnection between connectors 410 and 420 and ports 415 and 425 can be "passive pass-through" in that the signals from the connectors 410 and 420 to the ports 415 and 425 are directly passed through without processing or augmentation. The interconnection between connectors 410 and 420 and ports 415 and 425 can be "active pass-through" in that the signals from the connectors 410 and 420 to the ports 415 and 425 routed through processing circuits to maintain the signal integrity between the connectors 410 and 420 and the ports 415 and 425. The interconnection between connectors 410 and 420 and ports 415 and 425 can be "active" in that the connectors 410 and 420 can be interconnected to circuitry that augments or changes the signals before passing them to ports 415 and 425. For example, in an active interconnection, the connectors 410 and 420 may be USB-C connectors and ports 415 and 425 may be an HDMI port and an ethernet port.

Although the connector block is shown and described as having two connectors 410 and 420 and two ports 415 and 425 it is contemplated and within the scope of the invention to have varying numbers of connectors and ports on the connector block such as, for example, only one connector and more than two ports. It is also contemplated that connector 410 can be interconnected with port 415 via passive pass-through or active pass-through and that connector 420 can be an active connection to one or more ports.

FIGS. 5A-5D are perspective views of a docking station for an electronic device with a main body-portion removed to show details and FIGS. 6A-6D are perspective views of a connector block and sleeve of a docking station for an electronic device with a main body removed to show details. FIGS. 5A, 5B, 6A, and 6B show, generally, a sleeve 300 and a connector block 400 in an undocked state. FIGS. 5C, 5D, 6C, and 6D show generally, a sleeve 300 and a connector block 400 in a docked state. As shown in FIGS. 5A-6D, a docking station includes a sleeve 300 and a connector block 400. The connector block 400 can have connectors 410 and 420, a stem 450, and keyed guide rails 433 and 437 on the left and right sides, respectively. The sleeve 300 can have a hole 370 and a guide collar 350 surrounding the hole 370. The guide collar 350 can have notched portions 351 and 352 on the left and right sides, respectively. The sleeve 300 can have a plurality of raised contact points 360.

The guide collar 350 can be sized in relative proportions to slidably receive the stem 450 of the connector block 400. In the undocked position shown in FIGS. 5A, 5B, 6A, and 6B the connectors 410 and 420 can be disposed below the surface of the sleeve 300 and retracted into the guide collar 350. When an electronic device (not shown) such as a laptop computer is inserted into the sleeve 300, the sleeve 300 can pushed downwards into a docked position. In the docked position shown in FIGS. 5C, 5D, 6C and 6D, the connectors 410 and 420 can protrude through the hole 370 into the inside area of the sleeve 300 thereby allowing the connectors 410 and 420 to interface with corresponding ports of an electronic device (not shown). The top of the stem 450 can be the same shape and size as the hole 370 in the sleeve 400 such that the position of the stem 450 (and the connectors 410 and 420 thereon) in the docked position is further guided by the sidewalls of the hole 370. The surfaces of the guide collar 350 that slidably interface with the stem 450 can be generally parallel to the axis of insertion of the connectors 410 and 420.

Precision can be important when inserting the connectors 410 and 420 into the corresponding ports of an electronic device because the size of the connectors 410 and 420 are often very close in size with respect to the corresponding ports of the electronic device. Thus, slight inaccuracies in the size, position, or even rotation of the connectors 410 and 420 could cause the connectors 410 and 420 to be misaligned with respect to the corresponding ports of the electronic device thereby preventing smooth and easy docking.

The guide collar 350, stem 450, keyed guide rails 433 and 437, notched portions 351 and 352 can cooperate to ensure the position and rotation of the connectors 410 and 420. The guide collar 350 generally cooperates with the stem 450 to position the connector block 400. The keyed guide rails 433 and 437 generally cooperate with notched portions 351 and 352 to prevent the connector block 400 from rotating with respect to the sleeve 300. Each of the guide collar 350, stem 450, keyed guide rails 433 and 437, notched portions 351 and 352 cooperate to slidably engage the connector block 400 with respect to the sleeve 300.

The raised contact points 360 can serve as index points for contact between the sleeve 300 and the body 200. In preferred embodiments of the invention, the body 200 and the sleeve 300 are formed by injection molding. In the art of injection molding, surfaces of parts are commonly formed with slight angles ("draft") with respect to the angle of extraction from the mold such that the injection molded parts can easily slide free from the mold after molding. As a rule of thumb, a draft angle of 1½ to 2 degrees is preferred for most parts. Draft will allow for an easy, non-damaging release of a part from a mold when the expected shrinkage of thermoplastic material occurs. In the present invention, however, the sleeve 300 is configured to be slidably engaged within the body 200. If the surfaces were drafted according to the standard practice in the art of injection molding, the sleeve 300 would be tightly held by the body 200 when in the docked position and loosely held within the body in the undocked position. A variable fit could contribute to imprecision in docking. Thus, it is contemplated that the sleeve 300 have a plurality of contact points 360 that correspond to zero-draft surfaces inside the body 200 (e.g. FIG. 7, 216). As the name implies, the zero-draft surfaces can be formed without draft angle such that they are generally parallel to the sliding direction of the sleeve 300. The contact points 360 can slide against the zero-draft surfaces (e.g. FIG. 7, 216) to maintain a constant, smooth, and sliding fit between the sleeve 300 and the body 200. The zero-draft surfaces can be small with respect to the part being formed and can be formed during injection molding with minimal consequences. Alternatively the zero-draft surfaces can be formed by post-molding machining.

Figure 7:
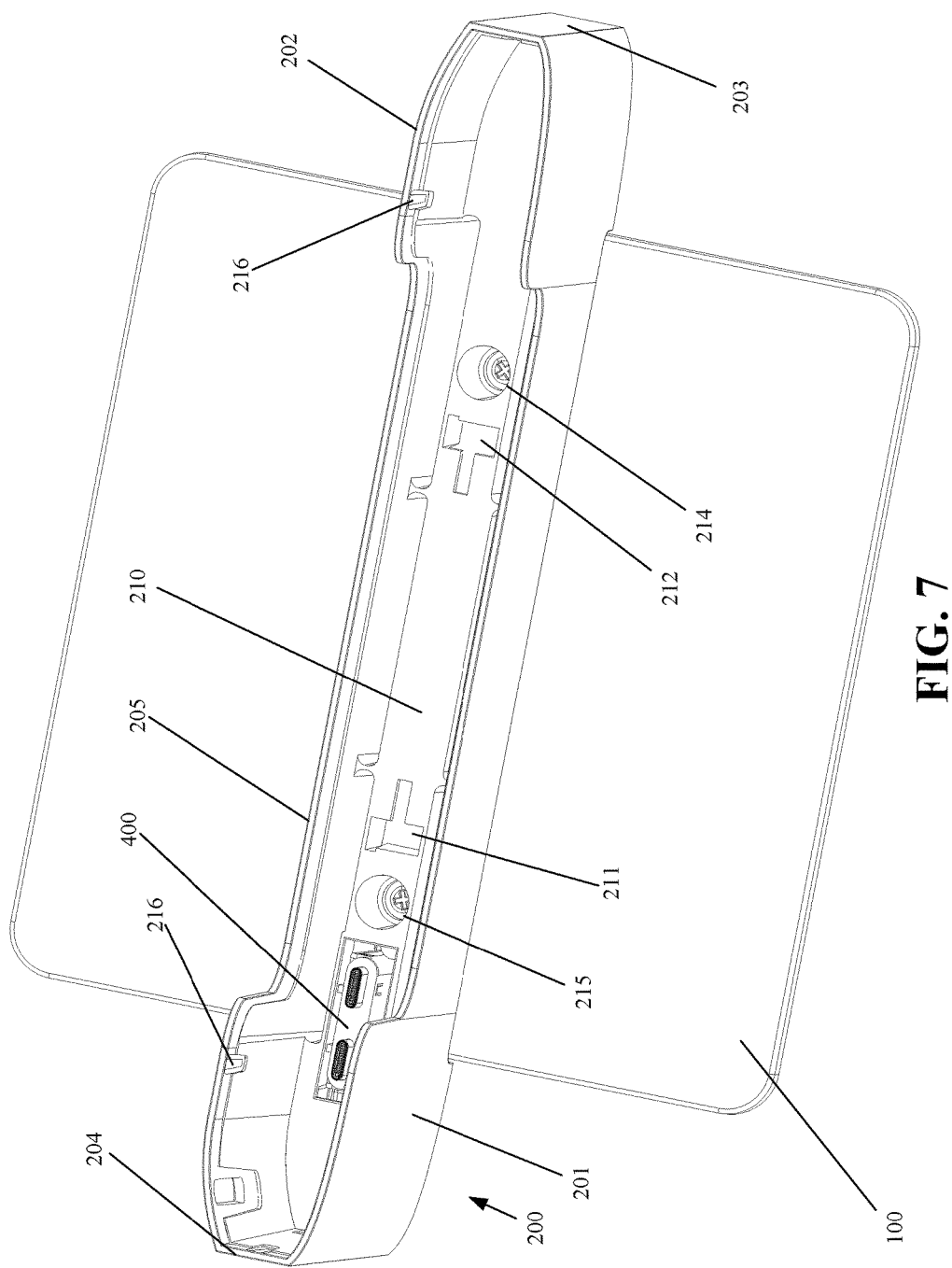
FIG. 7 is a top perspective view of a docking station for an electronic device with a sleeve removed to show details.

FIG. 7 is a top perspective view of a docking station for an electronic device with a sleeve removed to show details. As shown in FIG. 7, a docking station includes a base 100, a body 200 and a connector block 400. The body 200 can have a left side 201, a right side 202, a front side 203, a rear side 204, and a top side 205.

A slot 210 can be formed lengthwise in the top side 205 of the body 200 and extend substantially from the front side 203 to the rear side 204. The slot 210 can be formed in relative proportions to slidably receive a sleeve (FIG. 3, 300). The slot 210 can have cutouts 211 and 212 formed therein to slidably receive latch portions (FIGS. 3, 310 and 320) of a sleeve.

The slot 210 can have spring holes 214 and 215 to receive springs (not shown). The sidewalls of the spring holes 214 and 215 can stabilize springs inserted therein. The spring holes 214 and 215 can operate in conjunction with spring guides 330 and 340 (FIG. 3) of a sleeve to retain and stabilize springs inserted therein. The springs can exert an upward force on a sleeve and push a sleeve away from the body so that the connectors (not labeled) of the connector block 400 are disposed outside of the sleeve. In response to a compressive force exerted on the sleeve, the sleeve can slide into the slot 210 of the body 200 thereby compressing the springs and causing the connectors of the connector block 400 to protrude into the inside of the sleeve. The latches (FIGS. 3, 310 and 320) of the sleeve can lock the sleeve in the corresponding cutouts 211 and 212 of the body 200 and prevent the springs from pushing the sleeve completely out of the slot 210 of the body 200.

Zero-draft surfaces 216 can be formed in the slot 210. Zero-draft surfaces 216 can serve as slide points for contact points 360 (FIG. 5A-5D). The zero-draft surfaces 216 can have surfaces that are approximately parallel to the sliding direction of the sleeve within the slot 210 of the body 200. In cooperation, the zero-draft surfaces 216 contact points 360 (FIG. 5A-5D) can provide a stable and smooth slide of the sleeve from an undocked position to a docked position.

Figure 8A:
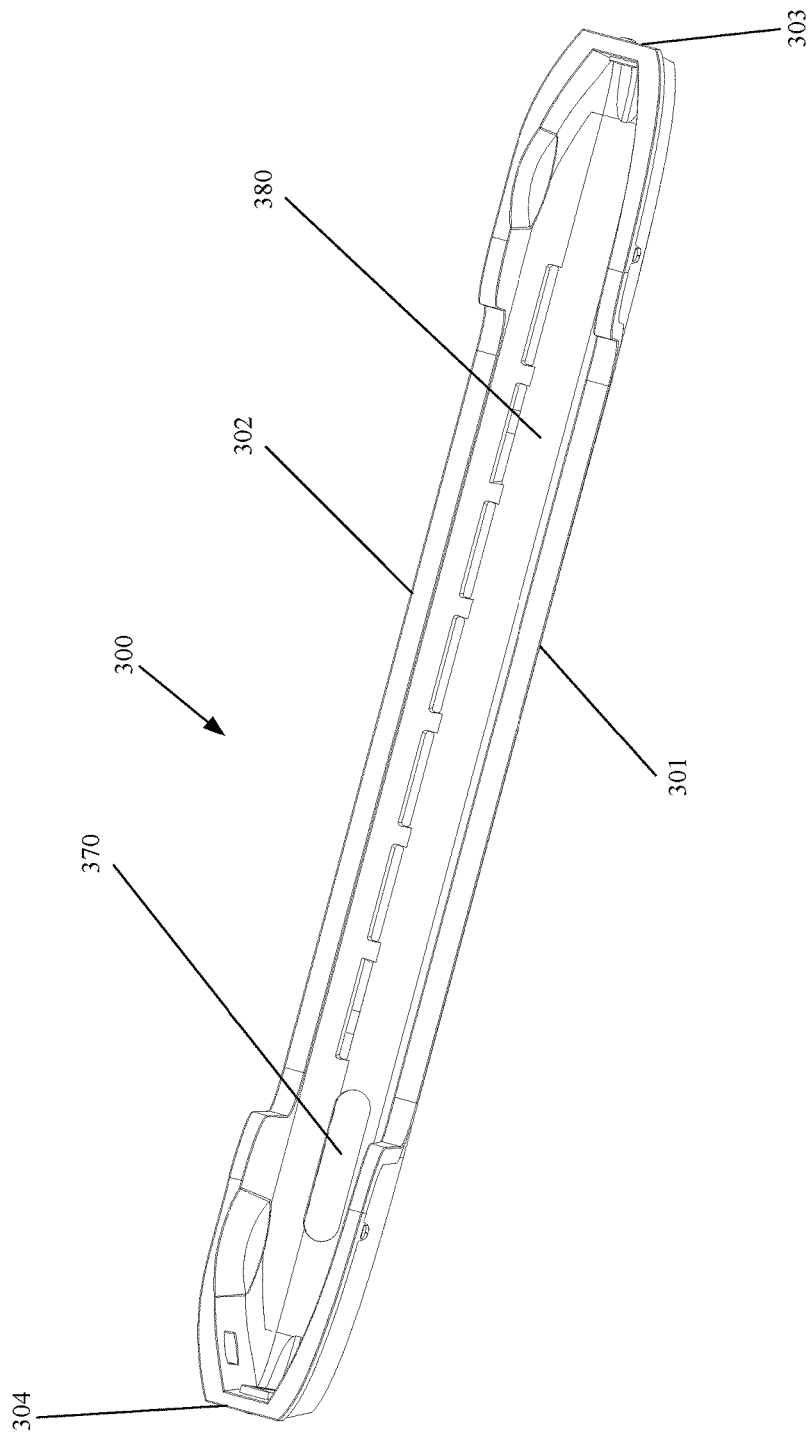
FIG. 8A is a top perspective view of a sleeve for a docking station for an electronic device.
Figure 8B:
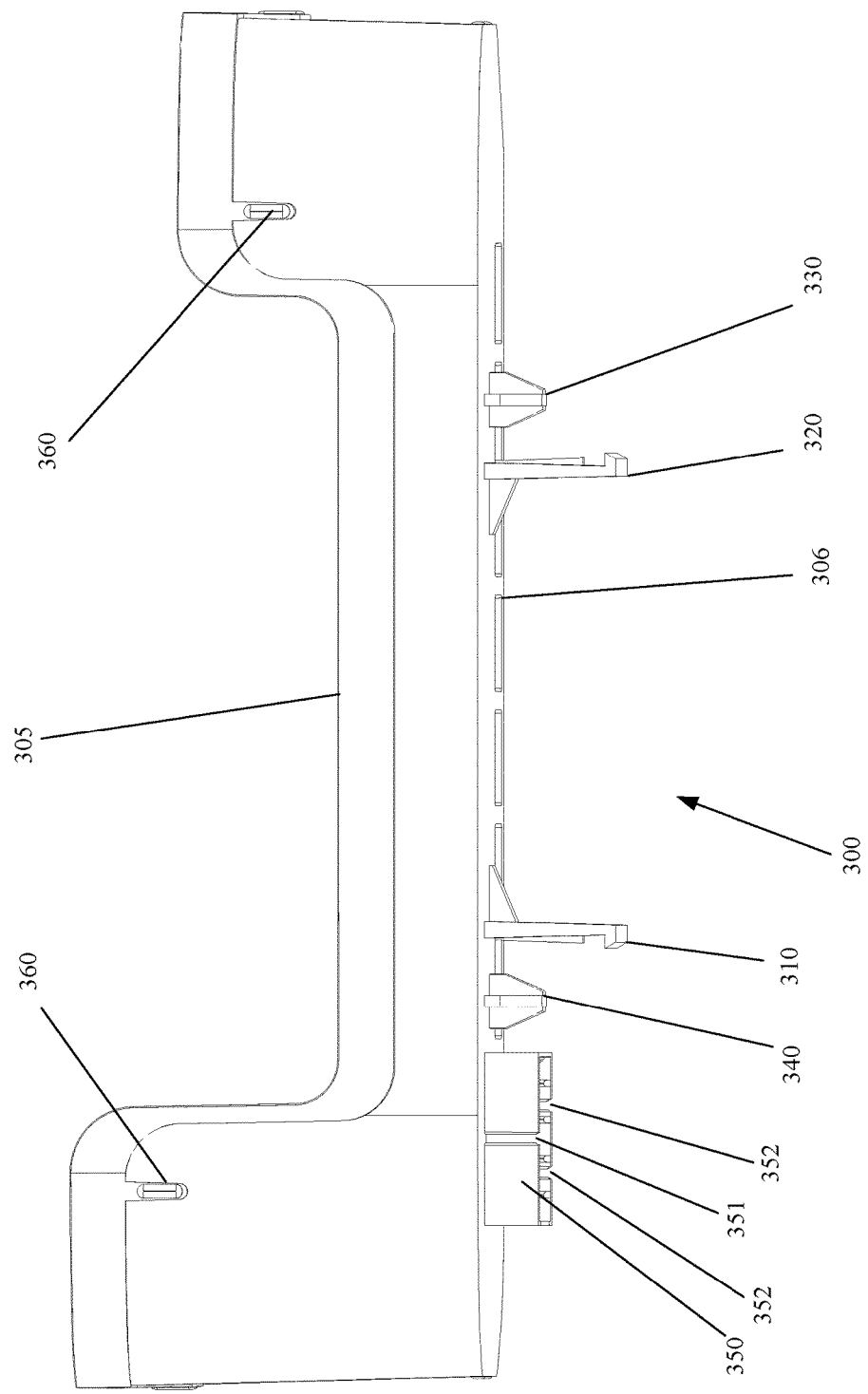
FIG. 8B is a left-side perspective view of a sleeve for a docking station for an electronic device.

FIG. 8A is a top perspective view of a sleeve for a docking station for an electronic device and FIG. 8B is a left-side perspective view of a sleeve for a docking station for an electronic device. As shown in FIG. 8A and FIG. 8B, a sleeve 300 includes a left side 301, a right side 302, a front side 303, a rear side 304, a top side 305 and a bottom side 306. The sleeve 300 can include latches 310 and 320, spring guides 330 and 340, and guide collar 350. The guide collar 350 can be notched 351 and 352 to slidably receive a connector block.

The sleeve 300 can have a hole 370 so that the connectors of a connector block can slide into and protrude into a slot 380 of the sleeve. The slot 380 can be sized in relative proportions to slidably receive an electronic device such as a laptop computer. The outside of the sleeve 300 can be sized in relative proportions to be slidably received in the slot (FIG. 7, 210) of the body.

The latches 310 and 320 can semi-permanently attach the sleeve 300 to the body. The spring guides 330 and 340 can receive and compress coil springs (not shown) such that when the sleeve 300 is connected to the body with latches 340 and 330, the sleeve 300 is spring-biased away from the body yet retained in the body by the latches 340 and 330.

The sleeve 300 can have a plurality of raised contact points 360. The raised contact points 360 can serve as index points for contact between the sleeve 300 and corresponding zero-draft surfaces of the body (e.g. FIG. 7, 216). The contact points 360 can slide against the zero-draft surfaces (e.g. FIG. 7, 216) to maintain a constant, smooth, and sliding fit between the sleeve 300 and the body.

Figure 9:
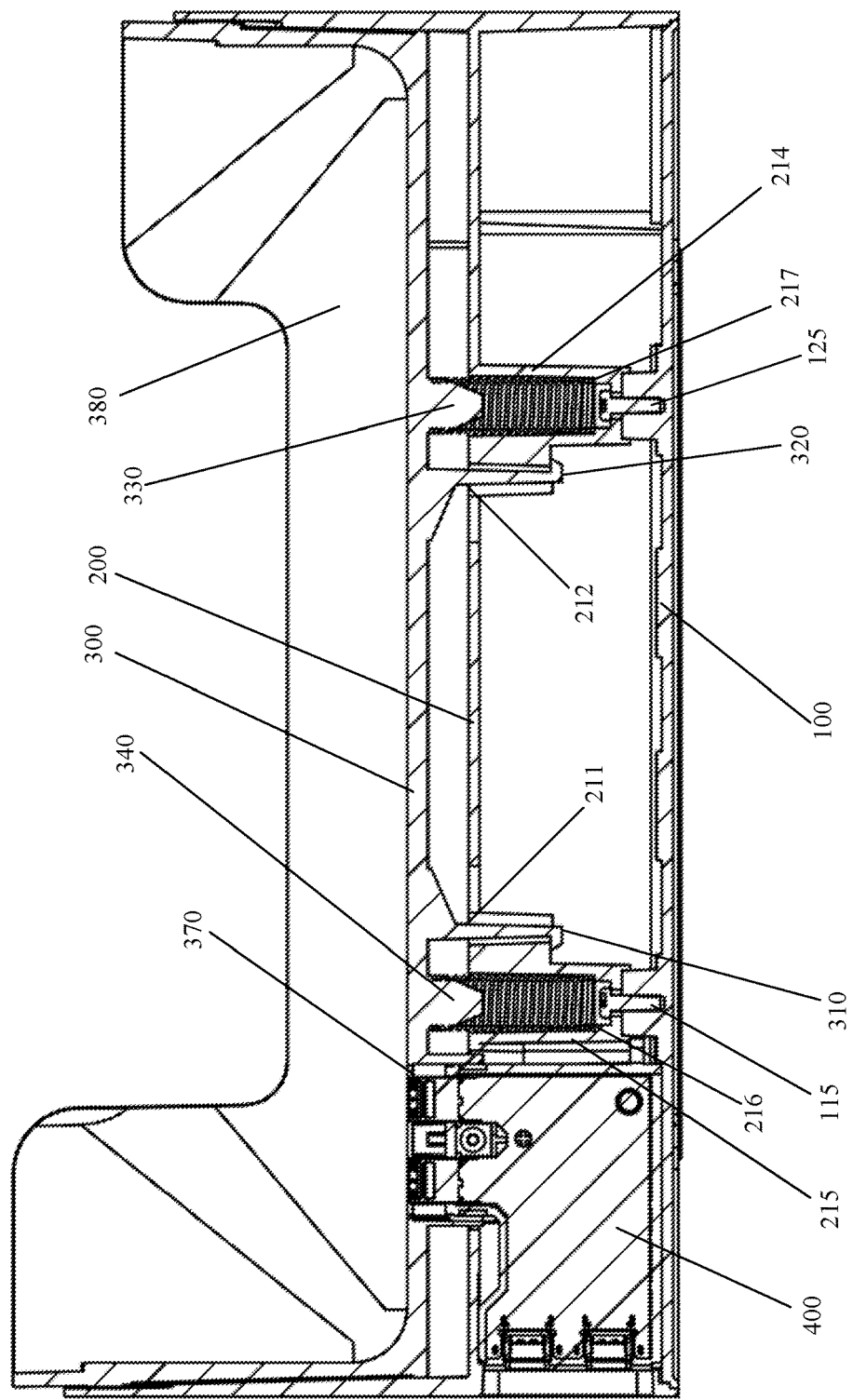
FIG. 9 is a cross sectional view of a docking station for an electronic device.

FIG. 9 is a cross sectional view of a docking station for an electronic device. As shown in FIG. 9, a docking station can include a base 100, a body 200, a sleeve 300, and a connector block 400. The connector block 400 can be fixed within the body 200. The sleeve 300 can be slidably received within the body 200. In use, a user can insert a laptop computer into the slot 380 of the sleeve 300 and, by pushing downwards, cause the sleeve 300 to slide deeper into the body 200. As the sleeve 300 slides into the body 200, the connectors (not labeled) of the connector block 400 slide into the sleeve 300 through hole 370 and into corresponding ports of the laptop (not shown). The sleeve 300 can help to position the laptop with respect to the connector block in the undocked position (shown) and then guide the laptop and its ports onto the connectors of the connector block 400.

Screws 115 and 125 can hold the body 200 to the base 100. The screws 115 and 125 can be disposed at the bottom of spring holes 214 and 215. Spring holes 214 and 215 can receive and hold coil springs 216 and 217. Springs 216 and 217 can be stabilized by spring guides 330 and 340. Cutouts 211 and 212 formed in the body 200 can slidably receive latch portions 310 and 320 of a sleeve 300 to retain the sleeve 300 in the body 200.

Figure 10:
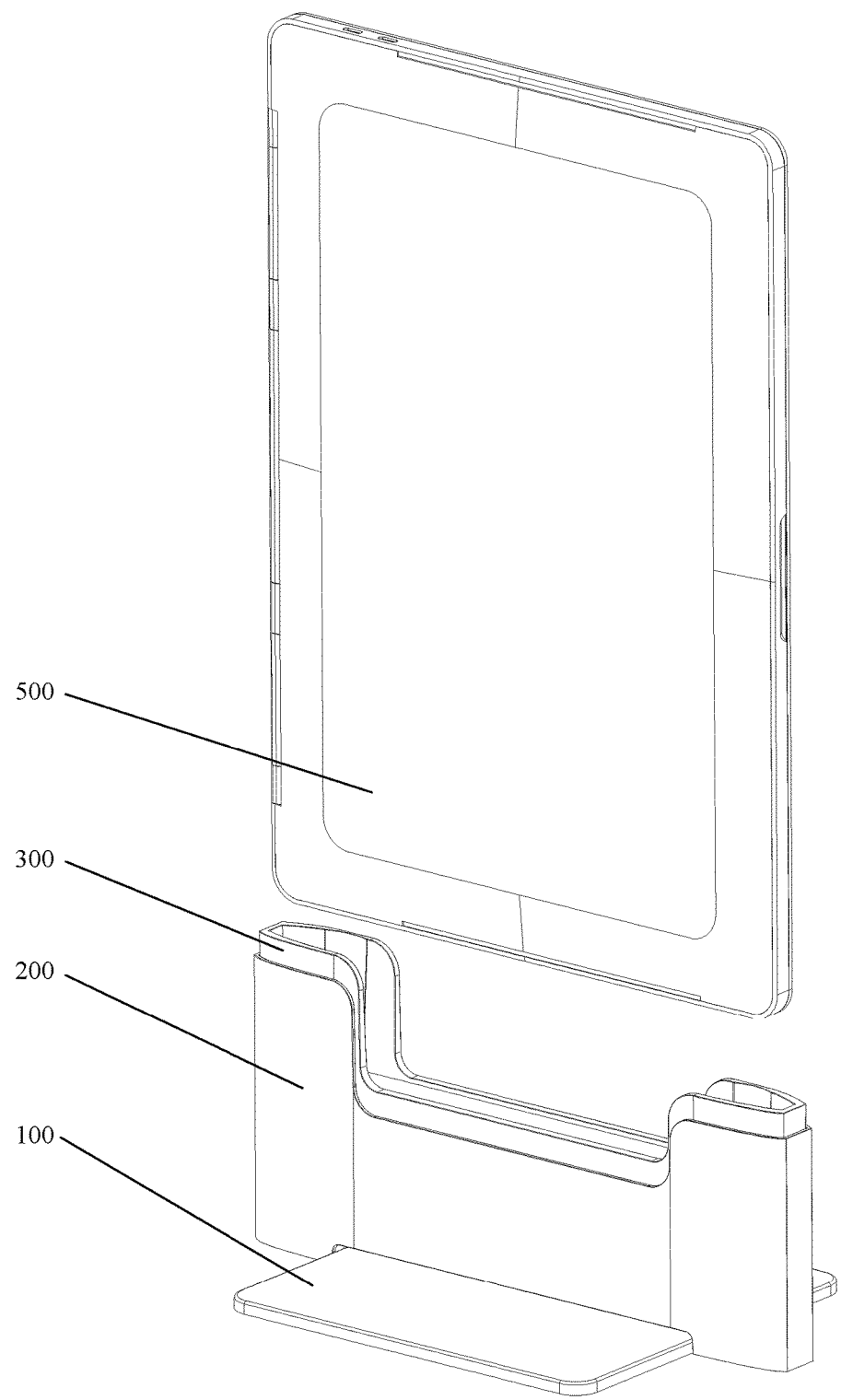
FIG. 10 is a left-side perspective view of a docking station and an electronic device.

FIG. 10 is a left-side perspective view of a docking station and an electronic device. As shown in FIG. 10, a docking station can include a base 100, a body 200, and a sleeve 300. The sleeve can receive an electronic device 500. The electronic device can have ports (not shown) that correspond in location and type to the connectors (FIGS. 4A, 410 and 420) of a connector block. The sleeve 300 can receive the electronic device 500 and ensure the proper positioning of the electronic device 500 with respect to the connector block.

It will be apparent to those skilled in the art that various modifications and variations can be made in the alignment sleeve for a docking station without departing from the spirit or scope of the invention. Thus, it is intended that embodiments of the invention cover the modifications and variations of this invention provided they come within the scope of the appended claims and their equivalents.

What is claimed is:

1. A docking station for an electronic device, the docking station comprising:
   a main body;
   a slot having an opening on a top of the main body;
   a first connector in the slot;
   a sleeve slidably disposed in the slot;

wherein the sleeve is sized in relative proportions to receive the electronic device;

wherein the sleeve is configured to slide linearly within the slot between a first position and a second position;

wherein, in the first position, the sleeve is captively retained in the slot and the first connector is outside of the sleeve; and wherein, in the second position, the first connector protrudes into the sleeve.

2. The docking station of claim 1 further comprising:
a second connector in the slot, the second connector positioned to interface with a second port of the electronic device.

3. The docking station of claim 2 further comprising:
a first port on the main body, the first port electrically connected to the first connector; and
a second port on the main body, the second port electrically connected to the second connector.

4. The docking station of claim 1 further comprising:
a spring connected to the sleeve, the spring configured to push the sleeve to the first position.

5. The docking station of claim 1 further comprising:
a spring hole in the slot for receiving the spring; and
a spring guide on a bottom side of the sleeve positioned to stabilize the spring and interface with the spring hole.

6. The docking station of claim 1 further comprising:
a latch configured to slidably retain the sleeve in the slot.

7. The docking station of claim 1 further comprising:
a hole in the sleeve in relative position to allow the first connector to pass through the hole and into the electronic device.

8. The docking station of claim 7 further comprising:
a guide collar extending from the hole.

9. The docking station of claim 8 further comprising:
a stem associated with the first connector, the stem in relative position to interface with the guide collar.

10. The docking station of claim 9 wherein the stem slides within the guide collar to guide the first connector into the electronic device.

11. The docking station of claim 1 further comprising:
a plurality of index members disposed on an outside of the sleeve, the plurality of index members positioned to contact one or more zero-draft walls of the slot in the main body.

12. A docking station for an electronic device, the docking station comprising:
a main body;
a slot having an opening on a top of the main body;
a first connector in the slot;
a second connector in the slot;
a sleeve captively retained and slidably disposed in the slot, the sleeve sized in relative proportions to receive the electronic device and configured to slide linearly within the slot between a first position and a second position;
a hole in the sleeve, the hole positioned to allow at least the first connector to pass therethrough; and
a guide collar surrounding the hole in the sleeve, the guide collar sized in relative proportions to a stem of the first connector such that, in cooperation, the stem is slidably disposed in the guide collar to position the first connector with respect to a first port of the electronic device.

13. The docking station of claim 12
wherein, in the first position, the first and second connectors are outside of the sleeve; and
wherein, in the second position, the first and second connectors protrude into the sleeve.

14. The docking station of claim 12 wherein the surfaces of the guide collar that slidably interface with the stems of the first and second connectors are parallel to an axis of the first connector.

15. The docking station of claim 12 further comprising:
a first port on the main body, the first port electrically connected to the first connector; and
a second port on the main body, the second port electrically connected to the second connector.

16. A docking station for an electronic device, the docking station comprising:
a main body;
a slot having an opening on a top of the main body;
a sleeve captively retained and slidably disposed in the slot, the sleeve sized in relative proportions to receive the electronic device and configured to slide linearly within the slot between a first position and a second position;
a connector module in the slot, the connector module comprising:
a first connector, the first connector positioned to interface with a first port of the electronic device;
a second connector, the second connector positioned to interface with a second port of the electronic device;
a circuit board connected to the first connector and the second connector;
a cover at least partially covering the first and second connectors and the circuit board;
a projection on an inside of the cover, the projection positioned to contact and support the circuit board; and
a hole in the slot of the main body sized in relative proportions to receive at least the first and second connectors of the connector module.

17. The docking station of claim 16 further comprising:
a hole in the sleeve, the hole positioned to allow at least the first connector to pass therethrough.

18. The docking station of claim 17 further comprising:
a guide collar surrounding the hole in the sleeve, the guide collar sized in relative proportions to a stem of the first and second connectors such that, in cooperation, the stem is slidably disposed in the guide collar to position the first and second connectors with respect to first and second ports of the electronic device.

19. The docking station of claim 16 further comprising:
a first port of the circuit board electrically connected to the first connector; and
a second port of the circuit board electrically connected to the second connector.

20. The docking station of claim 16 wherein a respective center of each of the first and second connectors are separated by 14.875 mm.

* * * * *